United States Patent
Horowitz et al.

(10) Patent No.: US 10,861,380 B2
(45) Date of Patent: Dec. 8, 2020

(54) DISPLAY SYSTEMS WITH HYBRID EMITTER CIRCUITS

(71) Applicant: Facebook Technologies, LLC, Menlo Park, CA (US)

(72) Inventors: Mark Alan Horowitz, Menlo Park, CA (US); Ilias Pappas, Cork (IE); Edward Buckley, Redmond, WA (US); William Thomas Blank, Bellevue, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/410,620

(22) Filed: May 13, 2019

(65) Prior Publication Data
US 2019/0347981 A1    Nov. 14, 2019

(30) Foreign Application Priority Data

May 14, 2018   (GR) ............................... 20180100206

(51) Int. Cl.
*G09G 3/32*       (2016.01)
*G02B 26/10*      (2006.01)
(Continued)

(52) U.S. Cl.
CPC ........... *G09G 3/32* (2013.01); *G02B 26/0833* (2013.01); *G02B 26/101* (2013.01); *G09G 3/02* (2013.01); *G09G 2320/064* (2013.01)

(58) Field of Classification Search
CPC .............. G02B 26/0833; G02B 26/101; G09G 2320/064; G09G 3/02; G09G 3/32
See application file for complete search history.

(56) References Cited

U.S. PATENT DOCUMENTS 6,771,232 B2   8/2004   Fujieda et al.
7,355,574 B1   4/2008   Leon et al.
(Continued)

FOREIGN PATENT DOCUMENTS

| EP | 2610846 A2 | 7/2013 |
|---|---|---|
| EP | 3151226 A1 | 4/2017 |
| WO | 2016196390 A1 | 12/2016 |

OTHER PUBLICATIONS

PCT/US2018/058804, "International Search Report and Written Opinion", dated Feb. 21, 2019, 12 pages.
(Continued)

*Primary Examiner* — Dmitriy Bolotin
(74) *Attorney, Agent, or Firm* — Weaver Austin Villeneuve & Sampson LLP

(57) ABSTRACT

Disclosed herein are display systems and techniques for operating a display in a display system. An output image is formed by scanning a column of light emitters such that emitters in different rows of the column contribute to a same location in the output image. The emitters are driven using pulse-width modulation (PWM). PWM pulses are applied in synchronization with the scanning to cause emitters to emit light at an intensity corresponding to an illumination parameter. The driving includes generating, based on an illumination parameter, a PWM pulse by applying an analog signal in combination with applying a digital signal. The analog signal controls an amplitude of the PWM pulse. The digital signal controls a duration of the PWM pulse.

20 Claims, 18 Drawing Sheets

(51) Int. Cl.
*G09G 3/02* (2006.01)
*G02B 26/08* (2006.01)

(56) References Cited

U.S. PATENT DOCUMENTS

| | | |
|---|---|---|
| 2007/0242002 A1 | 10/2007 | Kawabe |
| 2009/0051712 A1* | 2/2009 | Arai ................... G02B 26/0841 345/690 |
| 2011/0043541 A1 | 2/2011 | Cok |
| 2013/0169697 A1* | 7/2013 | Park ..................... G09G 3/2003 345/690 |
| 2015/0077414 A1 | 3/2015 | Yoo et al. |
| 2015/0186098 A1 | 7/2015 | Hall |
| 2015/0243068 A1 | 8/2015 | Solomon |
| 2016/0198533 A1 | 7/2016 | Williams et al. |
| 2017/0214907 A1 | 7/2017 | Lapstun |
| 2017/0236463 A1 | 8/2017 | Chi et al. |
| 2018/0182279 A1* | 6/2018 | Sakariya ............. G09G 3/2014 |

OTHER PUBLICATIONS

International Application No. PCT/US2019/032237, International Search Report and Written Opinion dated Jul. 30, 2019, 13 pages.
U.S. Appl. No. 16/178,505, "Non-Final Office Action", dated Feb. 20, 2020, 14 pages.
U.S. Appl. No. 16/178,510, "Non-Final Office Action", dated Feb. 20, 2020, 21 pages.

\* cited by examiner

DISPLAY SYSTEMS WITH HYBRID EMITTER CIRCUITS

CROSS-REFERENCE TO RELATED APPLICATIONS

This application claims the benefit and priority of Greece Patent Application No. 20180100206, filed May 14, 2018, entitled "Display Systems With Digital and Hybrid Mode Pixel Designs," the contents of Greece Patent Application No. 20180100206 are incorporated herein by reference in its entirety for all purposes.

BACKGROUND

Display devices such as light emitting diode (LED) displays include light emitters arranged in rows and columns to form an array of emitters, sometimes referred to as a display matrix. The emitters are often controlled by applying row and column control signals to select an individual emitter, in combination with a data signal that corresponds to the desired light output of the light emitter. The selection and data signals can be analog or digital.

SUMMARY

The present disclosure generally relates to display systems with hybrid emitter circuits and corresponding techniques for controlling the emitters in such display systems. Example embodiments are described with respect to a scanning display including a scanning arrangement that forms an output image by scanning across rows and/or columns of a physical display. However, the techniques described herein can be applied to other types of displays including displays that are not scanned, e.g., two-dimensional LED displays that are directly viewed by a user.

Advantages of pure analog control include lower clock speed, fewer wires in the display matrix, and ease of gamma correction. Disadvantages of pure analog control include color shifting (e.g., changes in color due to different currents, assuming the emitters are driven using current signals) and high noise in low level current settings. Advantages of pure digital control include little color change/shifting, constant current near maximum external quantum efficiency (EQE), and fewer analog values to manage. Disadvantages of pure digital control include: light emitters might not support necessary rise/fall times, and more wiring is required in the display matrix.

In certain embodiments, a hybrid control scheme involves using an analog signal (e.g., a fixed current bias or a variable current derived from a stored voltage) in combination with a digital signal to drive an emitter. The signal level of the analog signal controls the amplitude of a pulse-width modulation (PWM) pulse that drives an emitter, while the value of the digital signal controls the duration of the PWM pulse. The analog signal and/or the digital signal can be varied to change the characteristics of the PWM pulse from one pulse to the next.

In certain embodiments, a hybrid control scheme involves applying analog signals of different levels for driving different rows in a column of emitters. For example, a full current bias may be used for driving one or more emitters associated with the most significant bits (MSBs) of a binary input data value corresponding to a desired intensity, while a scaled current bias that is a fraction of the full current bias may be used for driving one or more emitters associated with the least significant bits (LSBs) of the input data value. The number of bits which correspond to MSBs and LSBs can vary. For example, the MSB portion can include only the highest valued bit and the LSB portion can include only the lowest valued bit. In certain embodiments, the MSB portion and the LSB portion are equally split, with half the bits of the input data value corresponding to LSBs and half corresponding to MSBs. As will be explained, the use of scaled current biases enables a longer emission time for emitters that are driven based on LSBs. This is advantageous in a scanning display, where the speed of a scanning assembly may determine the amount of time available for driving an emitter. Additionally, embodiments are described in which different current biases are applied to different rows of emitters to enable a greater range of intensity values to be output.

In certain embodiments, an input data value is stored using a static register. The data value can be read from the static register for driving different emitters at different times (e.g., so that each row in a column of emitters is sequentially driven based on the same data value). The data value stored in the static register can be read to form a digital signal which, when applied in combination with an analog signal (e.g., a full or scaled current bias), determines the intensity of the light emitted by an emitter.

In certain embodiments, an input data value is stored using a shift register. The data value can be read from the shift register for driving a particular emitter or group of emitters (e.g., an entire row) and then shifted into another shift register for driving a different emitter (e.g., an emitter in the next row). The data value stored in the shift register can be read to form a digital signal which, when applied in combination with an analog signal (e.g., a full or scaled current bias), determines the intensity of the light emitted by an emitter.

In certain embodiments, emitters are driven using a digital signal output by a comparator. The inputs of the comparator include a value from a digital counter and a binary data value (e.g., a data value obtained from a shift register or a static register). The comparator compares the value of the counter to the data value to form a digital signal. The digital signal can be applied in combination with an analog signal (e.g., a full or scaled current bias) to generate a PWM pulse for driving an emitter.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
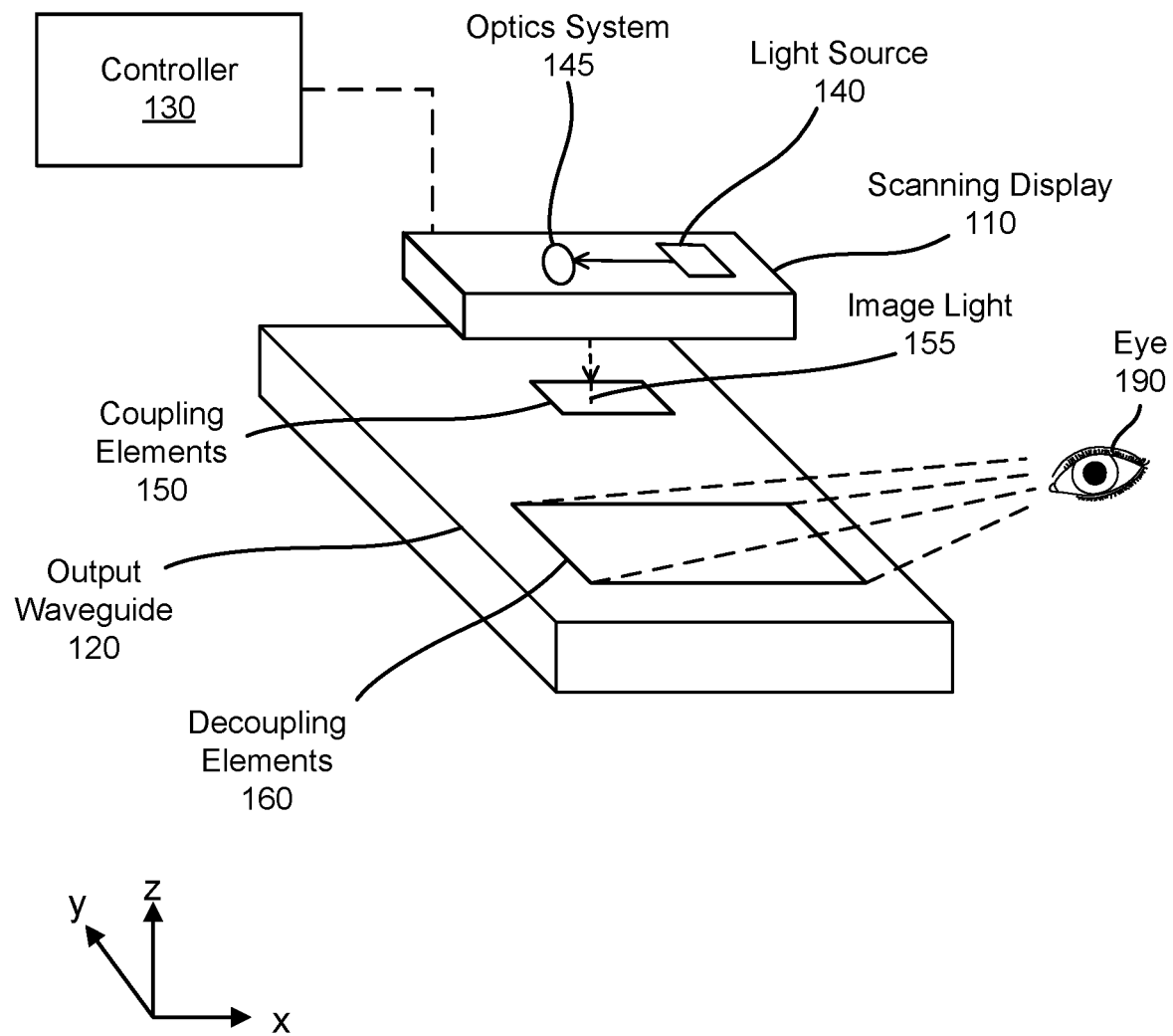
FIG. 1 shows an isometric view of a waveguide assembly for implementing one or more embodiments.

In the appended figures, certain naming conventions have been applied for convenience, such as the letter "M" followed by a numeral to identify a particular transistor in a circuit, or the letter "C" followed by a numeral to identify a particular capacitor in a circuit. The same text label may be applied to different components. Where appropriate, reference numerals have been added for clarity. For example, M1 in one figure may refer to a different transistor than M1 in another figure unless both M1s are marked with the same reference numeral.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

The terms "row" and "column" are used herein to refer to a physical arrangement of emitters and/or emitter related circuitry into groups, and are sometimes used together to differentiate between two spatial dimensions that are non-parallel, e.g., orthogonal, to each other. Rows and columns are generally interchangeable and should not be taken to refer to any particular dimension. For instance, a row can refer to either the horizontal or the vertical dimension of a display device.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

In a display, individual pixels may comprise groups of colored light emitters (e.g., one or more red LEDs, one or more green LEDs, and one or more blue LEDs). To create a specific color, the individual emitters forming the pixel are controlled to output colored light of particular intensities (brightness, which can be specified, for example, using grayscale values) so that when combined, the light from the emitters produce the desired color. For simplicity, control techniques are described with respect to intensity control involving setting grayscale values that correspond to desired intensity. However, it will be understood that variable color output can be achieved through coordinated control of light emitters of different colors. Additionally, for convenience, individual light emitters may sometimes be referred to herein as pixels even though in practice a pixel may include multiple light emitters.

Figure 2:
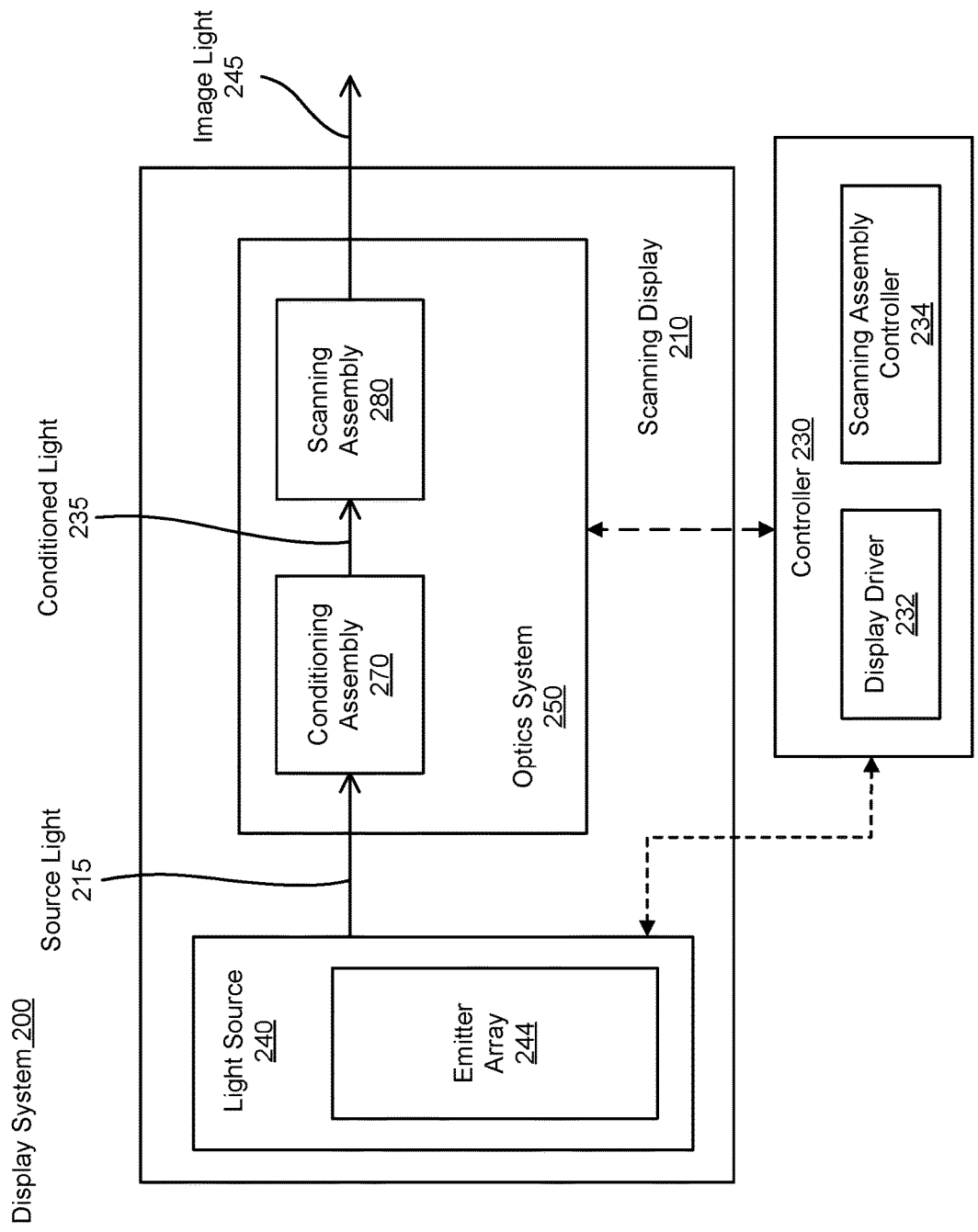
FIG. 2 is a simplified block diagram of a display system including a scanning display for implementing one or more embodiments.

In certain embodiments, a display is implemented as a scanning display, which includes a scanning assembly such as a microelectromechanical systems (MEMS) controlled scanning mirror. The scanning assembly may include MEMS structures to sweep the mirror across rows and/or columns of a display. The mirror may, for example, pivot or rotate about a fixed axis to scan up and down a row of microLEDs. An output image can be formed by coupling light from the mirror to the eye of the user. The speed of the scanning is such that multiple emitters in different rows and/or columns contribute to a single output pixel (e.g., a pixel projected onto a user's eye). The effect is that the intensities of the multiple emitters are combined through integration of the brightnesses in the human eye. An example of a scanning display is shown in FIG. 2.

Example embodiments are described with respect to current controlled displays, in which light emitters are controlled by applying current signals to drive emitters. However, it will be understood that voltage control and/or other types of electronic control are also possible in accordance with the techniques described herein.

In certain embodiments, a display may be integrated into a waveguide assembly for directing light from the display to the eye of a user wearing an HMD. FIG. 1 shows an example of such a waveguide assembly.

Example Display System

FIG. 1 shows a waveguide assembly 100 for implementing one or more embodiments. In some embodiments, the waveguide assembly 100 is a component of a near-eye display (NED), for example, an HMD. The waveguide assembly 100 includes a scanning display 110, an output waveguide 120, and a controller 130. For purposes of illustration, FIG. 1 shows the waveguide assembly 100 associated with a single eye 190, but in some embodiments, another waveguide assembly separate (or partially separate) from the waveguide assembly 100, provides image light to another eye of the user. In a partially separate system, one or more components may be shared between waveguide assemblies for each eye.

The scanning display 110 generates image light 155. The scanning display 110 includes a light source 140 and an optics system 145. The light source 140 is an optical component that generates light using a plurality of emitters placed in an array.

Figure 3:
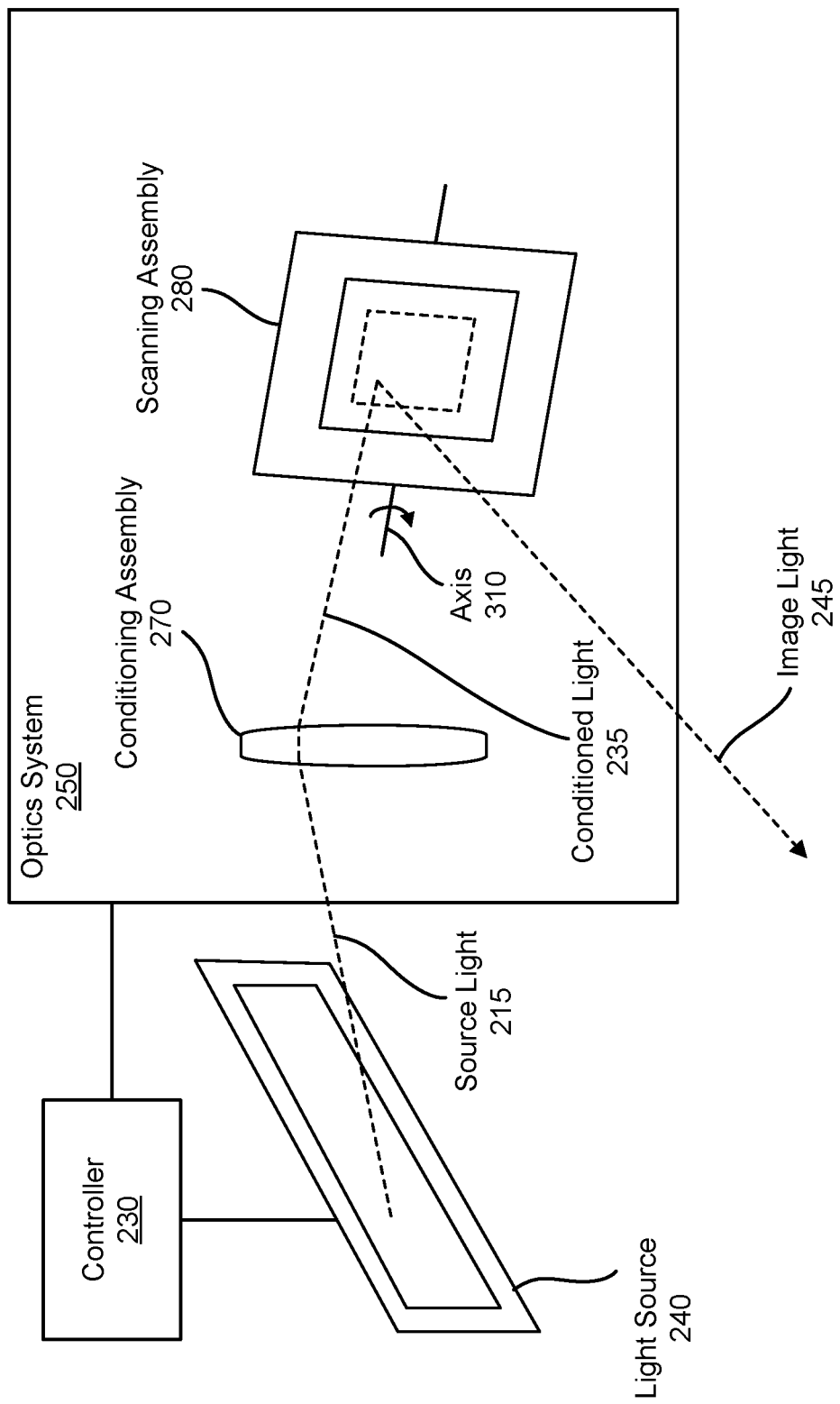
FIG. 3 shows the operation of the scanning display of FIG. 2.

The optics system 145 performs a set of optical processes, including, but not restricted to, focusing, combining, collimating, transforming, conditioning, and scanning processes on the image light generated by the light source 140. The optics system 145 may include a conditioning assembly and a scanning mirror assembly, which are shown in FIGS. 2 and 3. The scanning display 110 generates and outputs image light 155—influenced by at least one of the light source 140, the conditioning assembly, and the scanning mirror assembly—to one or more coupling elements 150 of the output waveguide 120.

The output waveguide 120 is an optical waveguide that outputs images to the eye 190 of the user. The output waveguide 120 receives the image light 155 at one or more coupling elements 150, and guides the received input image light 155 to one or more decoupling elements 160. In some embodiments, the one or more coupling elements 150 couple the image light 155 from the scanning display 110 into the output waveguide 120. The one or more coupling elements 150 may include, e.g., a diffraction grating, a holographic grating, some other element that couples the image light 155 into the output waveguide 120, or some combination thereof. For example, in embodiments where the coupling elements 150 include a diffraction grating, the pitch of the diffraction grating is chosen such that total internal reflection occurs, and the image light 155 propagates internally toward the one or more decoupling elements 160.

The one or more decoupling elements 160 decouple the total internally reflected image light from the output waveguide 120. The one or more decoupling elements 160 may include, e.g., a diffraction grating, a holographic grating, some other element that decouples image light out of the output waveguide 120, or some combination thereof. For example, in embodiments where the one or more decoupling elements 160 include a diffraction grating, the pitch of the diffraction grating can be chosen to cause incident image light to exit the output waveguide 120. An orientation and position of the light exiting from the output waveguide 120 is controlled by changing an orientation and position of the image light 155 entering the one or more coupling elements 150.

The output waveguide 120 may be composed of one or more materials that facilitate total internal reflection of the image light 155. The output waveguide 120 may be composed of e.g., silicon, plastic, glass, or polymers, or some combination thereof. The output waveguide 120 has a relatively small form factor. For example, the output waveguide 120 may be approximately 50 mm wide along an x-dimension, 30 mm long along a y-dimension and 0.5 to 1 mm thick along a z-dimension.

The controller 130 controls the scanning operations of the scanning display 110. The controller 130 determines scanning instructions for the scanning display 110 based at least on the one or more display instructions. Display instructions are instructions to render one or more images. In some embodiments, display instructions may simply be an image file (e.g., bitmap). The display instructions may be received from, e.g., a console of a NED system (not shown). Scanning instructions are instructions used by the scanning display 110 to generate image light 155. The scanning instructions may include, e.g., a type of a source of image light (e.g., monochromatic or polychromatic), a scanning rate, an orientation of a scanning apparatus, one or more illumination parameters (described below with reference to FIG. 2), or some combination thereof. The controller 130 includes a combination of hardware, software, and/or firmware not shown here so as not to obscure other aspects of the disclosure.

FIG. 2 is a simplified block diagram of a display system 200 for implementing one or more embodiments. The display system 200 includes a scanning display 210, which is an embodiment of the scanning display 110 of FIG. 1, and further includes a controller 230, a light source 240, and an optics system 250. The light source 240 is an embodiment of the light source 140; the optics system 250 is an embodiment of the optics system 145; and the controller 230 is an embodiment of the controller 130.

The scanning display 210 generates image light 245 in accordance with scanning instructions from the controller 230. The scanning display 210 includes a light source 240 and an optics system 250. The light source 240 is a source of light that generates a spatially coherent or a partially spatially coherent source light 215. The source light 215 may comprise a display image. The optics system 250 comprises at least a conditioning assembly 270 and a scanning assembly 280. The conditioning assembly 270 conditions the source light 215 into conditioned light 235, and the scanning assembly 280 scans the conditioned light 235. The image light 245 may be coupled to an entrance of an output waveguide (e.g., one or more coupling elements 150 of the output waveguide 120 of FIG. 1).

The light source 240 emits light in accordance with image data in the form of one or more illumination parameters received from the controller 230. An illumination parameter is used by the light source 240 to generate light. An illumination parameter may include, e.g., source wavelength, pulse rate, pulse amplitude, beam type (continuous or pulsed), other parameter(s) that affect the emitted light, or some combination thereof. The illumination parameter(s) and/or other image data can be supplied from the controller 230 to driving circuitry that generates, based on the image data, the signals which drive the light source. In particular, the illumination parameter(s) and/or other image data can be applied to drive an emitter of the light source 240 using analog and/or digital signals that determine characteristics of pulse-width modulation. The driving circuitry can be included in the light source 240 (e.g., co-located with emitters) or located external to the light source 240.

The light source 240 comprises a plurality of emitters, wherein each emitter may be, e.g., a light-emitting diode (LED), a laser diode, a vertical cavity surface emitting laser (VCSEL), an organic LED (OLED), a micro-LED (uLED), a tunable laser, or some other light source that emits coherent or partially coherent light. The emitters of the light source 240 emit light in a visible band (e.g., from about 390 nm to 700 nm), and they may emit light in accordance with one or more illumination parameters. In some embodiments, the scanning display 210 comprises multiple light sources, each with its own array of emitters emitting light in a distinct wavelength such that when scanned, light emitted from each of the light sources are overlapped to produce various wavelengths in a spectrum. Each emitter of the light source 240 comprises an emission surface from which a portion of source light is emitted. The emission surface may be identical for all emitters or may vary between emitters. An emitter width is a width of an area of the emission surface. The emission surface may have different shapes (e.g., circular, hexagonal, etc.). For example, an emitter which is a uLED with a circular emission surface may have an emitter width of 25 micrometers characterized as a diameter of the circular emission surface.

The emitters of the light source 240 are arranged as an emitter array 244. The emitters can be organized in a one-dimensional (1D) or two-dimensional (2D) array. In a 2D array, the emitters are formed along a first dimension and a second dimension orthogonal to the first dimension (e.g., along rows and columns). Each column of emitters corresponds to a respective column in an image ultimately displayed to the user. The emitters may be of various colors. For example, the light source 240 may include a set of red emitters, a set of green emitters, and a set of blue emitters, where emitters of different color together form an individual pixel. An individual pixel may include at least one red emitter, at least one green emitter, and at least one blue emitter. Rows of emitters of the same color may be arranged in a single group. For example, the array may comprise N rows of red emitters followed by N rows of green emitters and then N rows of blue emitters.

The light source 240 may include additional components (e.g., drivers, phantom memory, heat sinks, etc.). In one or more embodiments, the light source 240 comprises additional components (e.g., a plurality of driver circuits) that are electrically coupled to the emitter array 244. One or more of these additional components (e.g., a driver for each emitter) may be located around emitters in a column of emitters. The drivers provide circuitry for controlling the emitter array 244. For example, the drivers may apply illumination parameters received from the controller 230 (e.g., brightness values received from a display driver of the controller) to control each emitter using analog and/or digital control signals. The emitters can be controlled using currents (i.e., the display can be a current mode display) or voltages. In certain embodiments, the emitters are controlled using pulse-width modulation, amplitude adjustments, or a combination of both. In certain embodiments, the driver circuits include memory elements that act as a storage medium for storage of a data value with which an emitter is driven. Such memory elements can include phantom memory that are not read from directly for driving emitters, but are instead used for temporarily storing data values (e.g., for passing a data value to a memory element associated with the next emitter to be scanned, where the phantom memory holds the data value for a time period corresponding to scanning of a phantom or "dummy" emitter).

The conditioning assembly 270 conditions source light 215 from the light source 240. Conditioning the source light 215 may include, e.g., expanding, collimating, focusing, distorting emitter spacing, adjusting orientation an apparent location of an emitter, correcting for one or more optical errors (e.g., field curvature, chromatic aberration), some other adjustment of the light, or some combination thereof. The conditioning assembly 270 comprises one or more optical elements (e.g., lenses, mirrors, apertures, gratings, or any other suitable optical element that affects image light).

The scanning assembly 280 includes one or more optical elements that redirect light via one or more reflective portions of the scanning assembly 280. The reflective portions may comprise a scanning mirror or other reflective surface. The direction where the light is redirected toward depends on specific orientations of the one or more reflective portions. The one or more reflective portions of the scanning assembly may form a planar or curved surface (e.g., spherical, parabolic, concave, convex, cylindrical, etc.) that operates as a mirror. The scanning assembly 280 scans along at least one dimension of the emitter array 244. In some embodiments, the scanning assembly 280 is configured to scan in at least the smaller of the two dimensions. For example, if the emitters are arranged in a 2D array where the rows are substantially longer (i.e., contain more emitters) than the columns, then the scanning assembly 280 may scan down the columns (e.g., row by row or multiple rows at a time). In other embodiments, the scanning assembly 280 may perform a raster scan (horizontally or vertically depending on scanning direction). The scanning assembly 280 can include multiple scanning mirrors, each of which is configured to scan in 0, 1, or 2 dimensions. The scanning can be controlled using one or more MEMS devices, e.g., electrostatic or electromagnetic actuators, included in the optics system 250.

The controller 230 controls the light source 240 and the optics system 250. The controller 230 takes content for display and divides the content into discrete sections. The controller 230 instructs the light source 240 to sequentially present the discrete sections using individual emitters corresponding to a respective row or column in an image ultimately displayed to the user. The controller 230 instructs one or both of the conditioning assembly 270 and the scanning assembly 280 to condition and/or scan the presented discrete sections. The controller 230 controls the optics system 250 to direct the discrete sections of the image light 245 to different areas, e.g., different portions of one or more coupling elements 150 of the output waveguide 120. Accordingly, at the eye box of the output waveguide, each discrete portion is presented in a different location. While each discrete section is presented at different times, the presentation and scanning of the discrete sections occurs fast enough such that a user's eye integrates the different sections into a single image or series of images. The controller 230 also provides illumination parameters (e.g., intensity or brightness values) for the light source 240. The controller 230 may control each individual emitter of the light source 240.

The controller 230 may include a combination of software and/or hardware components that control the scanning assembly 280 in synchronization with controlling the light source 240. For example, the controller 230 may include one or more computer processors, a dedicated graphics processor, application-specific integrated circuits, software programs containing instructions for execution by the one or more computer processors, etc. In some embodiments, the controller 230 includes a display driver 232 and a separate scanning assembly controller 234. The display driver 232 can be implemented as an integrated circuit that generates the image data and/or illumination parameters for the light source 240 based on instructions from a computer processor executing a software application that determines the display images. For example, the software application can be an application that generates an AR or VR presentation for viewing on an HMD. The scanning assembly controller 234 may include circuitry that generates control signals for driving the scanning assembly 280 (e.g., control signals to one or more MEMS actuators). The display driver 232 and the scanning assembly controller 234 may be communicatively coupled to one another to facilitate the synchronization of output from the emitter array 244 with movement of the scanning assembly 280.

FIG. 3 shows the operation of the scanning display 210 of FIG. 2. The scanning display 210 generates light in accordance with scanning instructions from the controller 230. The light source 240 of the scanning display 210 generates the spatially coherent or the partially spatially coherent source light 215. The optics system 250 receives the source light 215 and, with the conditioning assembly 270, converts the source light 215 into conditioned light 235. The conditioned light 235 is then scanned by the scanning assembly 280. The scanning assembly 280 may perform the scanning by rotating about one or more axes (e.g., an axis 310), thereby emitting the image light 245 in one or more dimensions. The conditioned light 235 may be scanned such that at different rotational positions of the scanning assembly 280, different portions of the conditioned light 235 contribute to the same location in the image light 245. For example, light source 240 may be controlled to sequentially activate individual emitters in a column of emitters based on the same data value, and scanning assembly 280 may scan along the column so that the light emitted by the emitters is mapped onto the same location (e.g., the same pixel) in an output image viewed by a user.

Hybrid Analog Emitter Circuit

In certain embodiments, a hybrid control scheme involves controlling the intensity of light output in both the time domain (e.g., using PWM) and by applying analog signals of different levels (e.g., current levels). For example, a desired intensity level (represented, for example, as a grayscale value) can be set using a combination of analog and digital control signals to determine the amplitude and duration of a driving pulse. The combination of analog and digital control is referred to herein as "hybrid" control. Hybrid control may involve a variable analog component (e.g., using an analog current derived from a variable voltage to effect control in the voltage domain), a variable digital component (e.g., using a variable PWM duration to effect control in the time domain), or both.

Certain display environments are space constrained (e.g., a display integrated into an HMD). In such environments, due to the extremely small available pixel area, the amount of electrical components (e.g., transistors, capacitors or signal lines) that can be added to support hybrid control is limited. Therefore, it may be desirable for the control logic (e.g., display driver 232 in FIG. 2) and the driving circuitry that generates PWM pulses by which the emitters are driven to be implemented using as few components as possible.

Figure 4:
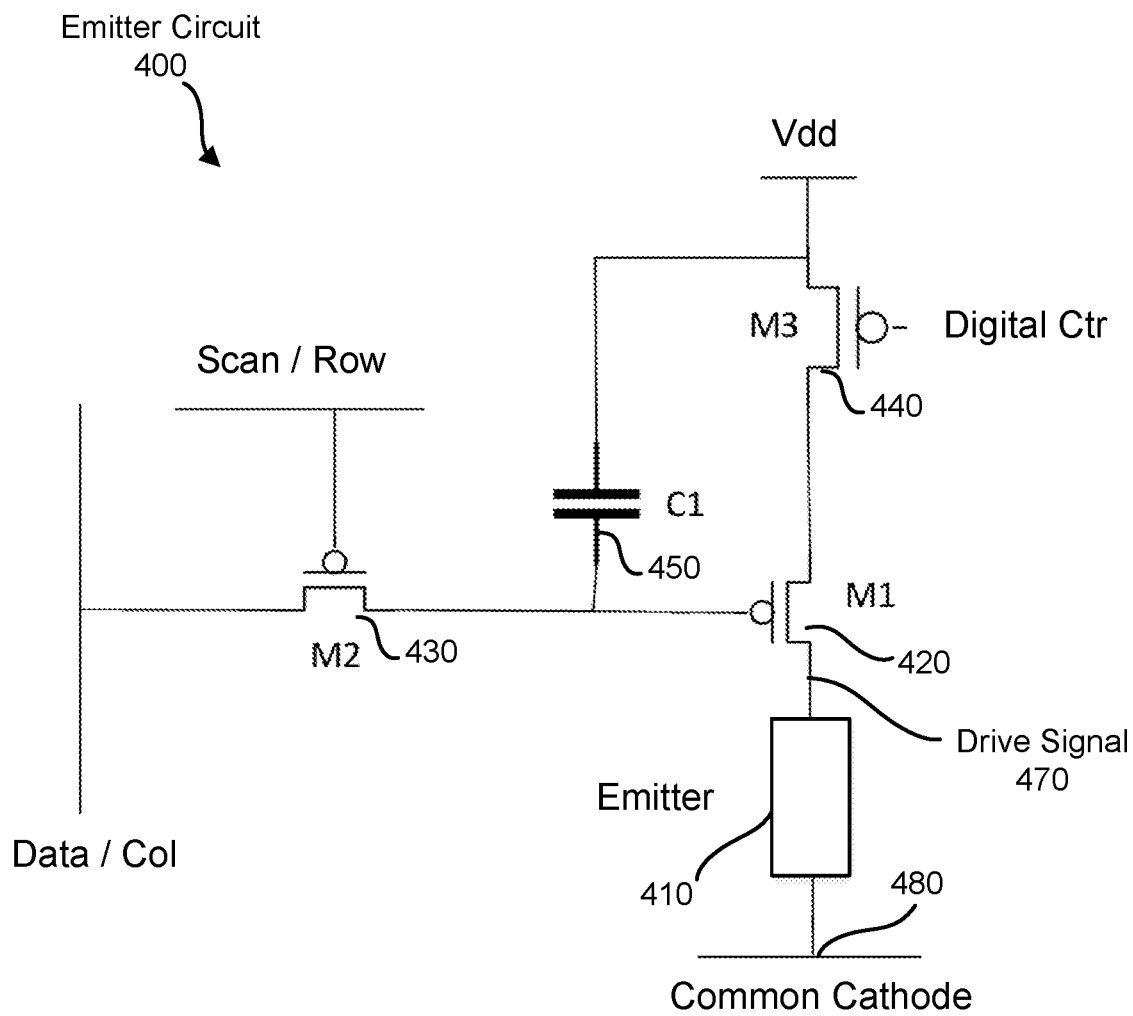
FIG. 4 shows a hybrid analog emitter circuit, in accordance with certain embodiments.

FIG. 4 shows an emitter circuit 400 according to certain embodiments. The emitter circuit 400 is an example of a hybrid analog emitter circuit and includes driving circuitry located in proximity to an emitter 410 (e.g., a uLED). However, in other embodiments, driving circuit may be remoted located (e.g., a centralized driving circuit to which multiple emitters are coupled). The emitter circuit 400 supports hybrid control and includes three transistors 420, 430, and 440 (M1, M2, and M3) and a storage capacitor 450 (C1). The transistors 420, 430, 440 can be implemented as p-channel metal-oxide-semiconductor field effect transistors (p-type MOSFETs or PMOS), but can also be implemented using other types of components (e.g., n-type MOSFETs).

The emitter 410 can be activated by asserting a data signal "Data/Col" in combination with a scan signal "Scan/Row." A separate scan signal can be provided for each row in the display to select one row at a time. The scan signal is applied to a gate of transistor 420, which is connected in series with the transistor 440. When the scan signal is logic level 0, transistor 420 is turned on to pass the data signal to a first terminal of the capacitor 450. The opposite terminal of capacitor 450 is connected to a supply voltage "Vdd." The data signal causes capacitor 450 to be charged to a desired voltage. A separate data signal can be provided for each column in the display.

After capacitor 450 is charged, the transistor 440 can be turned on using a digital control signal "Digital Ctr" to activate emitter 410. The voltage stored on capacitor 450 generates a current through transistor 420, along a path connecting the supply voltage Vdd to a cathode 480. Thus, the transistor 420 performs a voltage-to-current conversion that drives the emitter 410 by forming a drive signal 470 at the input of emitter 410. In certain embodiments, cathode 480 may be a common cathode shared by other emitters. The flow of current through transistor 420 (and therefore emitter 410) is controlled based on the value of the Digital Ctr signal, which is applied to the gate of transistor 440 to establish a connection to Vdd. In this manner, the Digital Ctr signal controls the duration with which emitter 410 is activated, while the value of Data/Col controls the extent to which emitter 410 is activated. The emitter 410 will emit light for a length of time according to the Digital Ctr signal and further based on the voltage applied to the gate of transistor 420, then turn off.

The Digital Ctr signal and the Data/Col signal can be used to simulate pure analog control, simulate pure digital control, or to implement a mix of analog and digital control. For example, pure digital control can be simulated by keeping the Data/Col signal fixed so that the same voltage is loaded onto capacitor 450 every time, and then using Digital Ctr to apply PWM based on variable pulse durations. Thus, Data/Col can be a global signal applied to multiple emitter circuits to program capacitor C1 in each emitter circuit to the same voltage. Digital Ctr would be individually applied to each emitter circuit to set a variable pulse duration.

To simulate pure analog control, the Digital Ctr signal could be configured for a fixed PWM interval. For example, the duration with which Digital Ctr is asserted could be set to a maximum allowable row time, in which case Digital Ctr could be used as a global signal instead of Data/Col. Then, the voltage stored on capacitor 450 could be varied by changing the Data/Col signal. Alternatively, both the Digital Ctr signal and the Data/Col signal can be varied so that neither the analog component nor the digital component of the hybrid control scheme is fixed. Thus, a hybrid control scheme permits two degrees of freedom with respect to how emitters are driven.

Figure 5:
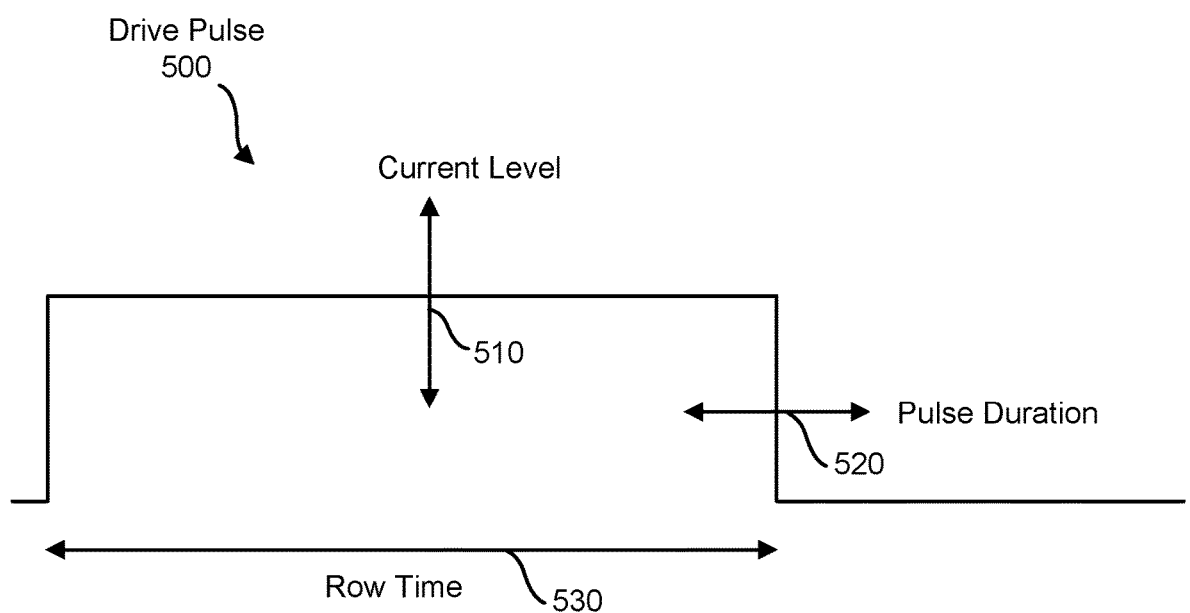
FIG. 5 shows a graphical representation of a control scheme for driving a hybrid analog emitter circuit, in accordance with certain embodiments.

FIG. 5 shows a graphical representation of a control scheme for driving a hybrid analog emitter circuit (e.g., emitter circuit 400). In FIG. 5, drive pulse 500 corresponds to the drive signal 470 in FIG. 4. The amplitude or current level 510 of the drive pulse 500 can be varied when analog control is desired. The pulse duration 520 of the drive pulse 500 can be varied when digital control is desired. In this example, the length of pulse duration 520 corresponds to a row time 530. The current level 510 can be set within a range of permitted current levels (e.g., one of four different current levels) and the pulse duration 520 can be set within a range of permitted pulse durations (e.g., one of four different pulse durations). The area of the drive pulse 500 corresponds to the mathematical product of the current level 510 multiplied by the pulse duration 520. The area determines the brightness of the light output by emitter 410 and is proportional to the number of photons that reach the eye from the emitter 410. One way to achieve 256 different grayscale levels is to use 16 different current levels and 16 different pulse durations (16×16=256). Different combinations of current levels and pulse durations can be used to achieve the same number of grayscale levels (e.g., 8 current levels and 32 pulse durations for 256 grayscale levels).

In embodiments where the current level 510 and the pulse duration 520 are both varied, a ratio between the pulse amplitude represented by current level 510 and the pulse duration 520 can be determined based on an input data value (e.g., an 8-bit grayscale value). For lower data values (e.g., values from 0 to 16), more digital control may be used so that the area of drive pulse 500 would be determined primarily based on pulse duration. For higher data values (e.g., values from 17 to 255), more analog control may be used so that the area of drive pulse 500 would be determined primarily based on current level. Using more digital control for lower data values compensates for some of the disadvantages of pure analog control (e.g., susceptibility to noise at low current levels and color shifting at different currents).

Hybrid Analog Emitter Circuit Operation (Example No. 1)

Figure 6:
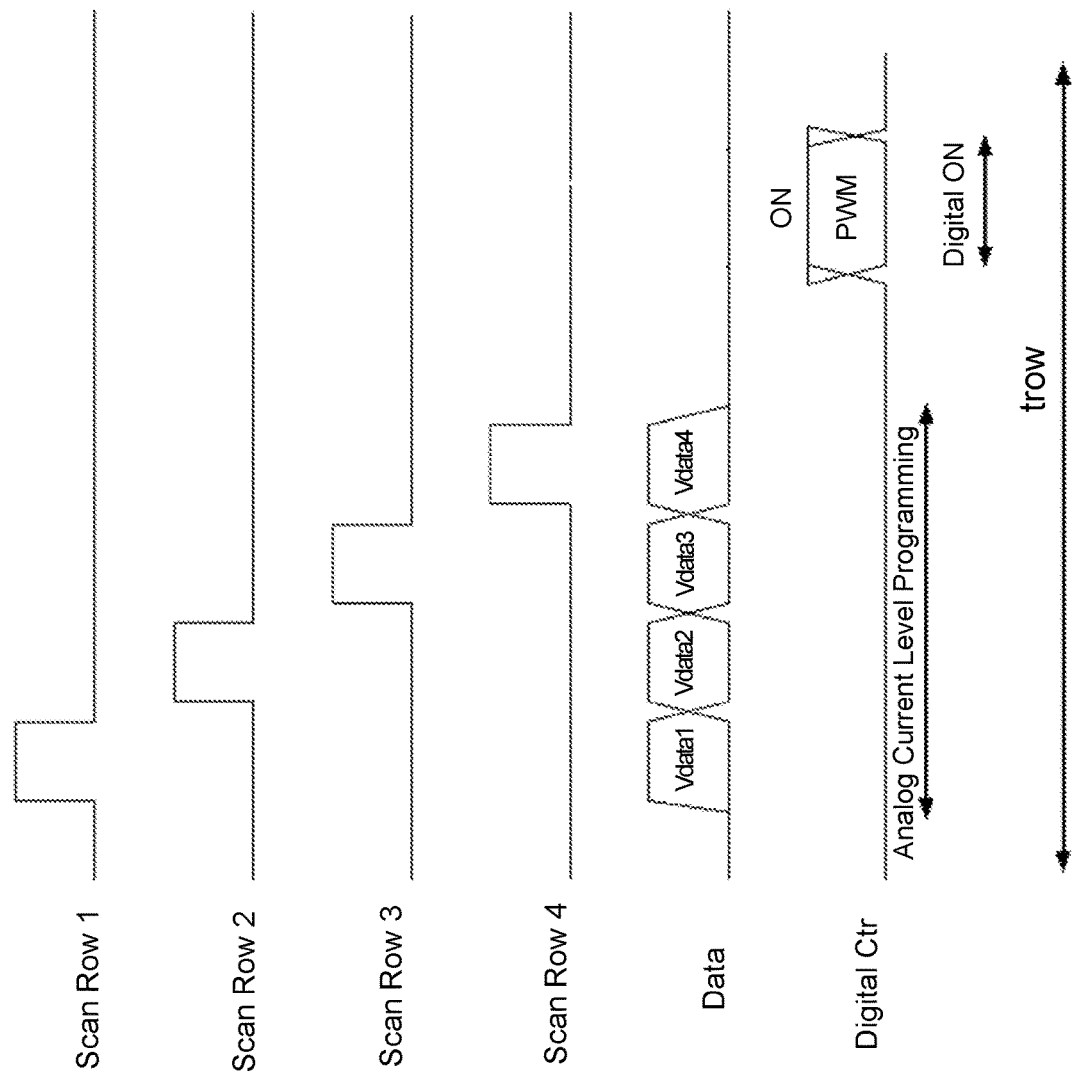
FIG. 6 shows an example timing diagram for the control scheme of FIG. 5.

FIG. 6 shows an example timing diagram for the control scheme of FIG. 5. Scan signals (Scan Row 1, Scan Row 2, Scan Row 3, and Scan Row 4) are shown for four rows of emitters. Each scan signal corresponds to an instance of the Scan/Row signal in FIG. 4. As shown, the rows are scanned at different times to sequentially activate emitters row by row. Each row is activated for a particular duration. At the beginning of each row time, each emitter circuit is programmed at one of several possible analog data values (e.g., 16 current levels) using a Data signal corresponding to the Data/Col signal in FIG. 4. The Data signal causes voltages (Vdata1, Vdata2, Vdata3, and Vdata4) to be stored on corresponding capacitors in emitter circuits associated with Rows 1 to 4. Thus, the Data signal performs analog current level programming. In this example, the Digital Ctr signal is a global signal that sets the same PWM duration "Digital ON" for all four rows. The PWM duration can be one of several possible durations (e.g., 16 durations so that, when combined with the 16 different current levels, each row produces a brightness corresponding to one of 256 possible grayscale values). In this example, the PWM duration is a fraction of the row time "trow," with part of the row time being used for analog current level programming.

Hybrid Digital Emitter Circuit

Figure 7:
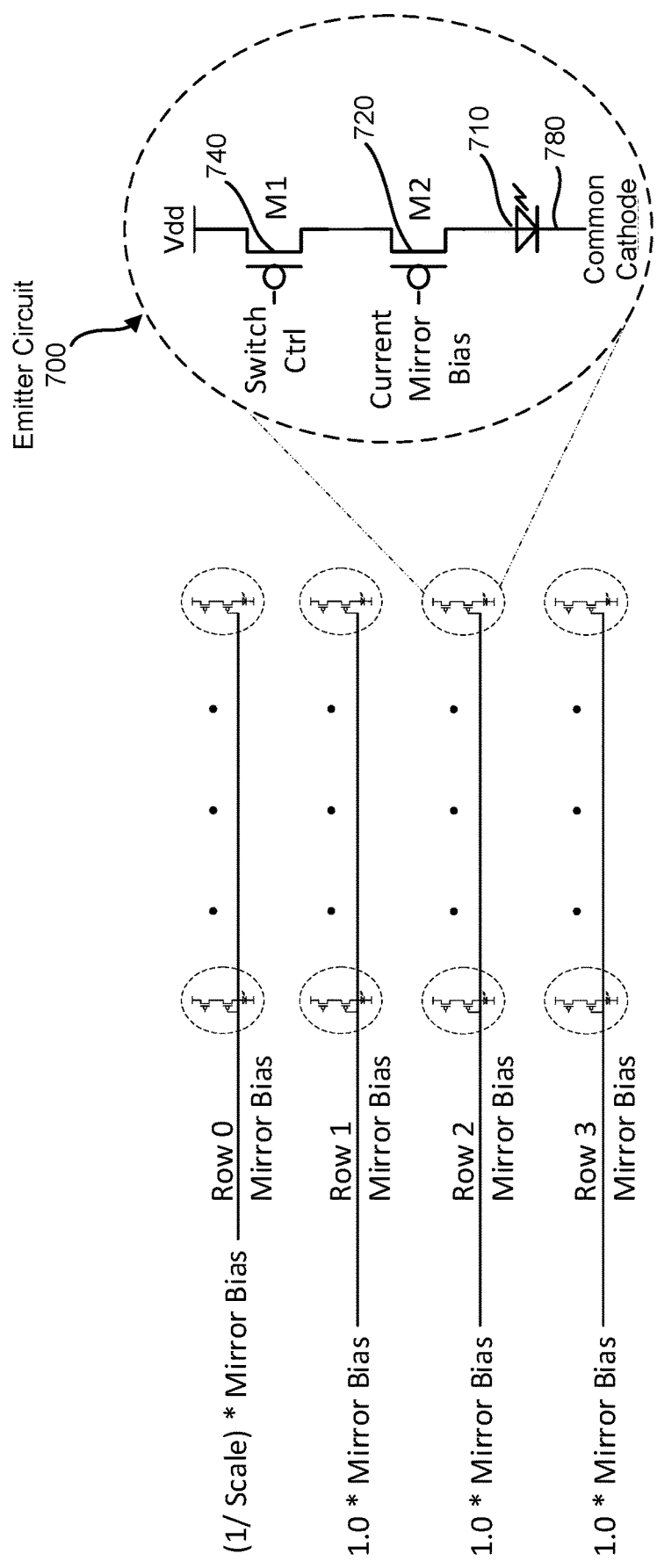
FIG. 7 shows a hybrid digital emitter circuit, in accordance with certain embodiments.

FIG. 7 shows an emitter circuit 700 according to certain embodiments. The emitter circuit 700 is an example of a hybrid digital emitter circuit and can be controlled using the hybrid control scheme illustrated in the figure. The emitter circuit 700 includes an emitter 710 (depicted as a diode), a first transistor 740, and a second transistor 720. The transistors 720 and 740 can be implemented as PMOS transistors and are analogous to the transistors 420 and 440 in FIG. 4, respectively. The transistor 740 operates as a control switch that is controlled by a digital signal "Switch Ctrl" applied to the gate of transistor 740. The transistor 720 is controlled by a current bias "Current Mirror Bias" applied to the gate of transistor 720. Transistor 720 performs a voltage-to-current conversion similar to that described earlier with respect to transistor 420. However, unlike the emitter circuit 400, the emitter circuit 700 does not include a capacitor for storing an analog representation of a programmed value. Since transistor 740 operates at a fixed current (e.g., a full current bias for Row 2), the emitter 710 is controlled by varying the Switch Ctrl signal.

As shown in FIG. 7, different current biases can be applied to different rows. For example, in a column comprising four rows of emitters (Row 0, Row 1, Row 2, and Row 3), a full current bias can be applied to emitter circuits 700 associated with rows that are driven based on the most significant bit or bits of a binary input data value, and a scaled current bias can be applied to emitter circuits 700 that drive one or more rows based on the least significant bit or bits of the input data value. The scaled current bias is a fraction of the full current bias and can be derived using a scale factor "Scale." In FIG. 7, a full current bias is applied to Rows 1 to 3 and a scaled current bias is applied to Row 0. The current biases can be generated using voltage references that are input to current mirrors (not shown). For example, a first voltage reference can be coupled to current mirrors in each MSB row for generating a full current bias and a second voltage reference coupled to current mirrors in each LSB row for generating a scaled current bias.

Using different current biases for different rows has certain advantages. For example, if one or more rows receive a smaller current bias than the other rows, then the LSB times can be increased to permit the emitters to be turned on for a longer period of time to meet a timing constraint imposed by the speed (e.g., scan rate) of the scanning assembly. The speed of the scanning assembly may limit the amount of time available for turning on the emitter in any given row. For example, if the scanning assembly operates at a frequency of 440 Hz, then the shortest permitted (minimum) row time may be approximately 345 ns. To ensure adequate performance (e.g., uniform pixel resolution of the output image), the emitters should have an available on-time that is significantly less than this (about 50% or 173 ns is generally sufficient). This available on-time is allocated for driving based on all N bits of an N-bit input data value. In order to support eight bits of input data precision at a speed of 173 ns, a relatively fast clock rate would be needed in order to drive based on the LSB portion of the eight bits (e.g., 2.7 ns, corresponding to 371 Mhz). Due to the resistor-capacitor (RC) time constraints of the emitters, it may not be possible to turn the emitters on and off fast enough to meet the required clock rate. Further, the control signals for creating such a small timing may be difficult to generate and are susceptible to noise. Increasing the LSB times would alleviate these problems.

The use of a scaled current bias permits longer LSB times because a smaller current can be paired with a longer pulse duration to achieve the same intensity (as explained earlier in connection with FIG. 5, intensity can be determined based on the combination of current level and pulse duration). This avoids having to use shorter pulse durations to produce low intensities, e.g., intensities represented by the LSBs of an input data value. Assuming the same available on-time of 173 ns from the example above, using a 4-bit PWM scheme (with four bits for setting the Switch Ctrl signal), the clock rate could be reduced to 173 ns/16=10.8 ns, corresponding to 93 Mhz. Using a 5-bit PWM scheme would allow even longer pulse durations than a 4-bit PWM scheme and reduce the clock rate by a factor of 32.

Hybrid Digital Emitter Circuit Operation (Example No. 2)

A total of $2^8$ grayscale or linear scaled values can be achieved using the hybrid digital emitter circuit 700 of FIG. 7 and the following configuration: 4-bit PWM, two current values per color (one full current bias and one scaled current bias), four rows of emitters (one LSB row and three MSB rows), where each MSB row is controlled the same way (i.e., the same pulse duration and the same current bias), and scale factor=16/3=5.3.

With the above configuration, the MSB rows (e.g., Rows 1 to 3) can be controlled using the Switch Ctrl signal so that the on-time of the emitters in the MSB rows corresponds to one of the following values: [128, 64, 32, 16]. The scale factor of 16/3 is calculated according to the formula below so that the on-time of the emitters in the LSB row (e.g., Row 0) corresponds to one of the following values: [8, 4, 2, 1].

$$[128,64,32,16]*(1/3 \text{ rows})*(1/\text{scale factor})=[8,4,2,1].$$

The scale factor is a function of the ratio of LSB rows to MSB rows (in this example, 1/3) and the number of bits each row produces (e.g., a bit depth of 16).

If the outputs of the MSB rows and the LSB row are combined (e.g., using a scanning assembly), then a total of 256 unique values can be represented in the combined output. That is, the aggregate brightness of a column of emitters spanning all four rows can be set to a brightness level corresponding to any value between 0 and 255.

Hybrid Digital Emitter Circuit Operation (Example No. 3)

A total of $2^{10}$ grayscale or linear scaled values can be achieved using the hybrid digital emitter circuit 700 and the following configuration: 5-bit PWM, two current values per color (one full current bias and one scaled current bias), four rows of emitters (one LSB row and three MSB rows), where each MSB row is controlled the same way, and scale factor=32/3=10.7.

With the above configuration, the MSB rows can be controlled so that the on-time of the emitters in the MSB rows corresponds to one of the following values: [512, 256, 128, 64, 32]. The scale factor of 32/3 is calculated according to the formula below so that the on-time of the emitters in the LSB row corresponds to one of the following values: [16, 8, 4, 2, 1].

$$[512,256,128,64,32]*(1/3 \text{ rows})*(1/\text{scale factor})=[16,8,4,2,1].$$

In this example, the scale factor of 32/3 is based on the ratio of LSB to MSB rows being the same as in Example No. 2 (i.e., 1/3), but with a bit depth of 32 instead of 16.

If the outputs of the MSB rows and the LSB row are combined, then a total of 1024 unique values can be represented in the combined output.

Hybrid Digital Emitter Circuit Operation (Example No. 4)

Example No. 4 is similar to Example No. 2, except that instead of controlling the MSB rows the same way, each MSB row is controlled independently. That is, the pulse duration can be set independently for each MSB row to allow the MSB rows to be driven using different pulse durations. This enables a total of 765 greyscale values based on the following configuration: PWM of 4 digital bits, two current values per color, 4 rows of emitters (one LSB row and three MSB rows), where each MSB row can be controlled independently, and scale factor=16/3.

With the above configuration, the MSB rows can be controlled so that the on-time of the emitters in the MSB rows corresponds to one of the following values: [128, 64, 32, 16]. The scale factor of 16/3 is calculated according to the formula below so that the on-time of the emitters in the LSB row corresponds to one of the following values: [8, 4, 2, 1].

$$[128,64,32,16]*(1/3 \text{ rows})*(1/\text{scale factor})=[8,4,2,1].$$

Since each of the three MSB rows can output one of $2^8$ values, this produces a total of $3*(2^8-1)=765$ possible greyscale values (corresponding to $2^{9.5}$ linear scaled values) when the outputs of the MSB rows and the LSB row are combined.

Hybrid Digital Emitter Circuit Operation (Example No. 5)

Another way to generate a total of $2^8$ grayscale or linear scaled values using the hybrid digital emitter circuit 700 is to use the following configuration: 4-bit PWM, two current values per color, eight rows of emitters (one LSB row and seven MSB rows), where each MSB row is controlled the same way, and scale factor=16/7=2.3.

With the above configuration, the MSB rows can be controlled so that the on-time of the emitters in the MSB rows corresponds to one of the following values: [128, 64, 32, 16]. The scale factor of 16/7 is calculated according to the formula below so that the on-time of the emitters in the LSB row corresponds to one of the following values: [8, 4, 2, 1].

$$[128,64,32,16]*(1/7 \text{ rows})*(1/\text{scale factor})=[8,4,2,1].$$

Hybrid Digital Emitter Circuit Operation (Example No. 6)

Yet another way to generate a total of $2^8$ grayscale or linear scaled values using the hybrid digital emitter circuit 700 is to use the following configuration: 4-bit PWM, two current values per color, eight rows of emitters (two LSB rows and six MSB rows), where the MSB rows are controlled the same way, the LSB rows are controlled the same way (but not necessarily the same as the MSB rows), and scale factor=32/6=5.3.

With the above configuration, the MSB rows can be controlled so that the on-time of the emitters in the MSB rows corresponds to one of the following values: [128, 64, 32, 16]. The scale factor of 32/6 is calculated according to the formula below so that the on-time of the emitters in the LSB rows corresponds to one of the following values: [8, 4, 2, 1].

$$[128,64,32,16]*(1/3 \text{ rows})*(1/\text{scale factor})=[8,4,2,1].$$

Example No. 6 is advantageous in that, since there are two LSB rows, if an emitter in one of the LSB rows is defective, the column can still produce the desired total intensity provided that the display is recalibrated (e.g., so that the non-defective LSB emitter is activated for twice as long to compensate for the missing contribution of the defective LSB emitter).

Hybrid Digital Emitter Circuit Operation (Example No. 7)

Another way to generate a total of $2^{10}$ grayscale or linear scaled values using the hybrid digital emitter circuit 700 is to use the following configuration: 5-bit PWM, two current values per color, eight rows of emitters (two LSB rows and six MSB rows), where the MSB rows are controlled the same way, the LSB rows are controlled the same way, and scale factor=32/3=10.7.

With the above configuration, the MSB rows can be controlled so that the on-time of the emitters in the MSB rows corresponds to one of the following values: [512, 256, 128, 64, 32]. The scale factor of 32/3 is calculated according to the formula below so that the on-time of the emitters in the LSB rows corresponds to one of the following values: [16, 8, 4, 2, 1].

[512,256,128,64,32]*(1/3 rows)*(1/scale factor)=[16, 8,4,2,1].

Hybrid Digital Emitter Circuit Operation (Example No. 8)

A total of 1,984 grayscale values can be achieved using the hybrid digital emitter circuit 700 and the following configuration: 5-bit PWM, two current values per color, eight rows of emitters (two LSB rows and six MSB rows), where the MSB rows are controlled the same way, the LSB rows are controlled independently, and scale factor=32/3=10.7.

With the above configuration, the MSB rows can be controlled so that the on-time of the emitters in the MSB rows corresponds to one of the following values: [512, 256, 128, 64, 32]. The scale factor of 32/3 is calculated according to the formula below so that the on-time of the emitters in the LSB rows corresponds to one of the following values: [16, 8, 4, 2, 1].

[512,256,128,64,32]*(1/3 rows)*(1/scale factor)=[16, 8,4,2,1].

In this example, the total number of greyscale values is $(2^{10}-1)+(2^5-1)*(2^5-1)=1,984$, which corresponds to $2^{10.95}$ linear scaled values.

Hybrid Digital Emitter Circuit Operation (Example No. 9)

Although not provided for in a specific numerical example, it is possible to control each MSB row independently in combination with controlling each LSB row independently. This would provide even more flexibility in the number of potential intensity values.

Summary of Hybrid Digital Emitter Circuit Examples

The following table summarizes each of the hybrid digital emitter circuit examples discussed above:

| | LSB Rows | MSB Rows | PWM Bits | Uniform Row Treatment | Scale Factor | Linear Intensity Control Bits |
|---|---|---|---|---|---|---|
| Example No. 2 | 1 | 3 | 4 | Yes | 16/3 | 8 |
| Example No. 3 | 1 | 3 | 5 | Yes | 32/3 | 10 |
| Example No. 4 | 1 | 3 | 4 | No (MSB rows independent) | 16/3 | 9.5 |
| Example No. 5 | 1 | 7 | 4 | Yes | 16/7 | 8 |
| Example No. 6 | 2 | 6 | 4 | Yes | 32/6 | 8 |
| Example No. 7 | 2 | 6 | 5 | Yes | 32/3 | 10 |
| Example No. 8 | 2 | 6 | 5 | No (LSB rows independent) | 32/3 | 10.95 |

Display Pipeline

Figure 8:
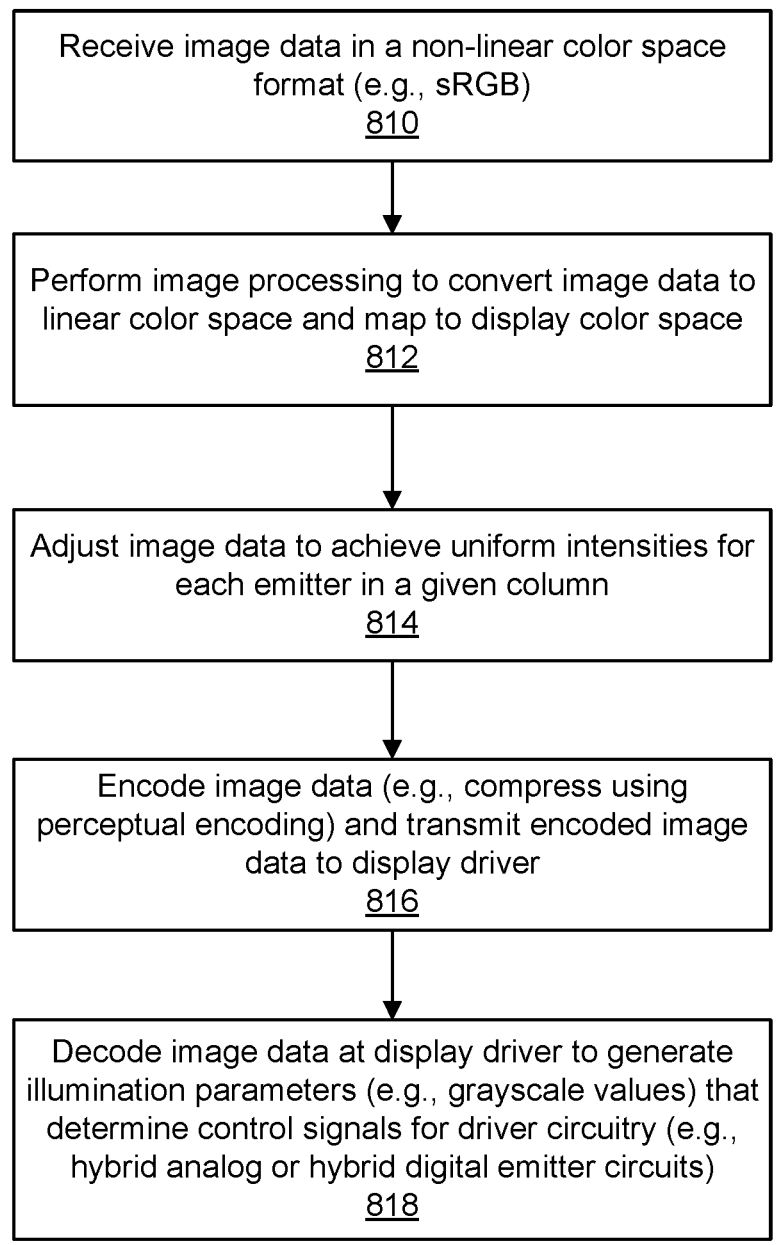
FIG. 8 is a simplified flowchart of a method for processing image data through a display pipeline, in accordance with certain embodiments.

FIG. 8 is a simplified flowchart of a method 800 for processing image data through a display pipeline, according to certain embodiments. The method 800 can be performed by a controller of a emitter array (e.g., controller 230 in FIG. 2) and can be applied to both hybrid analog emitter circuits and hybrid digital emitter circuits.

At 810, image data is received in a non-linear color space format (e.g., standard RGB or sRGB). The image data can be generated, for example, by a processor running an AR or VR application. In a linear encoding or scale, the intensity values are equally spaced in proportion to the amount of light to be emitted at a given pixel. sRGB data is generally encoded according to a gamma-compressed non-linear scale.

At 812, image processing is performed to convert the image data to a linear color space. For example, the sRGB data can be linearized using gamma expansion, to transform an image to a linear RGB color space by reversing the gamma compression. Luminance/grayscale values can then be calculated from the transformed RGB components. After conversion to a linear color space, the image data is mapped to a display color space (e.g., the color space of the light source 240). This mapping can be performed using a three-dimensional lookup table and can be omitted if the display color space is the same as the input color space.

At 814, the image data is adjusted to achieve uniform intensities for each emitter in a given column of the emitter array. This process can be referred to as "column correction" and can be performed through measurement of intensities, calibration based on the measurements, and storage of calibration information (e.g., correction information for each emitter). In addition to column correction, additional image processing can be performed to enhance the image data or facilitate transmission of image data down the pipeline. For example, spatial dithering can be performed to reduce data bandwidth.

At 816, the image data is encoded (e.g., compressed using a perceptual encoding) and transmitted to a display driver (e.g., display driver 232). Perceptual encoding can be used to further reduce data bandwidth for transmission to the display driver, and can be performed using a piecewise-linear transformation.

At 818, the image data is decoded (e.g., by display driver 232) to generate illumination parameters (e.g., grayscale values) that determine control signals for driver circuitry such as the hybrid analog or hybrid digital emitter circuits described earlier.

Digital Controller—Shift Register Based Driver

Control schemes applicable to hybrid analog and hybrid digital emitter circuits were described above. The hybrid analog and hybrid digital emitter circuits can be integrated into a display system including a controller that generates illumination parameters for an emitter array (e.g., controller 230). The following discussion relates to various embodiments of a digital controller. A digital controller uses digital components, such as static or shift registers, to transmit image data (e.g., illumination parameters). In certain embodiments, a digital controller can be used in combination with a digital hybrid emitter circuit that supports extended LSB times (e.g., digital hybrid emitter circuit 700).

In certain embodiments, a digital controller can be used for driving individual emitters using a single on/off transition per input data value. This would avoid potential issues that may arise with multiple on/off transitions. For example, depending on the amplitude of the drive current and/or the capacitance of the emitter circuit, there may be some delay between applying a PWM pulse and emission of light. This delay depends on the existing voltage across the emitter (e.g., a diode) at the time the PWM pulse starts. If the emitter is driven using multiple on/off transitions, then the existing voltage depends on the value of prior input data bits used to drive the emitter, making calibration for column correction difficult.

Figure 9:
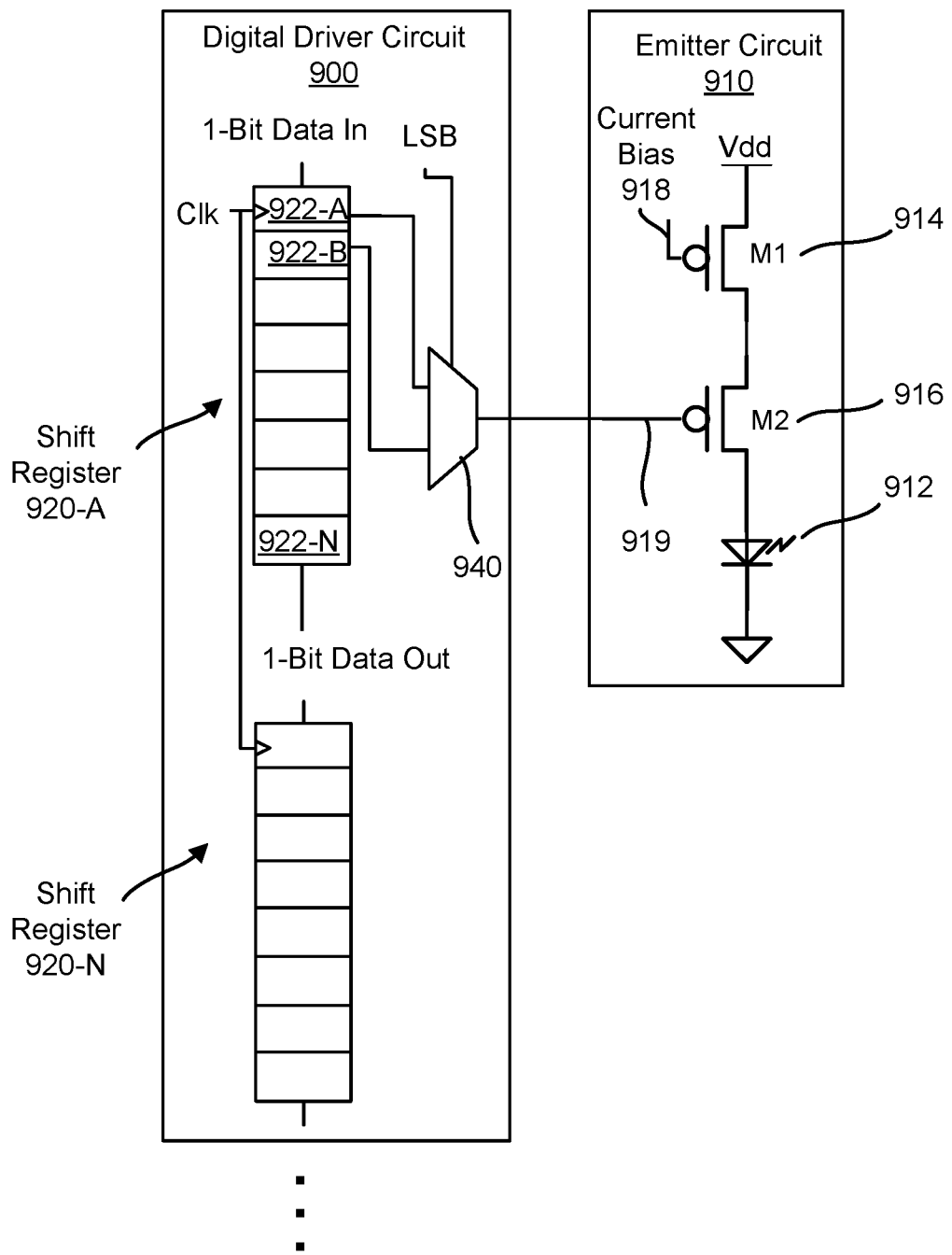
FIG. 9 shows a simplified schematic of a digital driver circuit for driving an emitter, in accordance with certain embodiments.

FIG. 9 shows a simplified schematic of a digital driver circuit 900 for driving a hybrid digital emitter circuit (e.g., an emitter circuit 910), in accordance with certain embodiments. The driver circuit 900 can be integrated into a digital controller (e.g., as part of display driver 232 in FIG. 2). Emitter circuit 910 is an example of a hybrid digital emitter circuit and includes components similar to those described with regard to hybrid digital emitter circuit 700, except that the positions of the transistor that acts as a control switch (M2 916) and the transistor (M1 914) that receives a current bias are reversed. In FIG. 9, the transistor 914 receives, as current bias applied to the gate of transistor 914, a current bias 918 from a current mirror (not shown). The gate of transistor 916 is controlled by a signal 919 output by a multiplexer (MUX) 940 in the driver circuit 900.

The driver circuit 900 includes one or more shift registers 920. Although only two shift registers are shown (920-A and 920-N), a separate shift register and MUX can be provided for each row in a column of emitters (assuming that data is to be sequentially shifted through rows). For the sake of clarity, the MUX coupled to shift register 920-N is omitted from the figure. In FIG. 9, the shift register 920-A is coupled to an emitter 912 through the MUX 940. The MUX 940 is a 2:1 multiplexer whose inputs are connected to the first two stages in the shift register 920-A. Each shift register 920 comprises multiple 1-bit shift stages, with a 1-bit data input "Data In" being received at the first stage (e.g., 922-A) and shifted into the next stage with each new cycle of a clock signal "Clk" until the last stage (e.g., 922-N) of the shift register is reached. The total number of stages in the shift register 920 corresponds to the number of bits in an input data value. In this example, there are eight stages, corresponding to each bit of an 8-bit input data value. The output "Data Out" of each shift register (except for the last shift register) is coupled to the Data In of the next shift register. In FIG. 9, the MUX 940 is controlled using an "LSB" select signal to select between the outputs of the first two shift stages 922-A and 922-B, which correspond to the least significant bits of the 8-bit input data value in this example. The handling of the two LSBs varies as a function of row. For example, if the control scheme shown in FIG. 7 were used, the values stored in the shift stages 922-A and 922-B could be used to drive the emitter in Row 0, but not Rows 1 to 3. In certain embodiments, a corresponding driver circuit may be provided with a MUX controlled using an MSB select signal, where the MUX selects between MSBs of an input data value for generating a control signal applied to an emitter circuit corresponding to an emitter in an MSB row.

Figure 10:
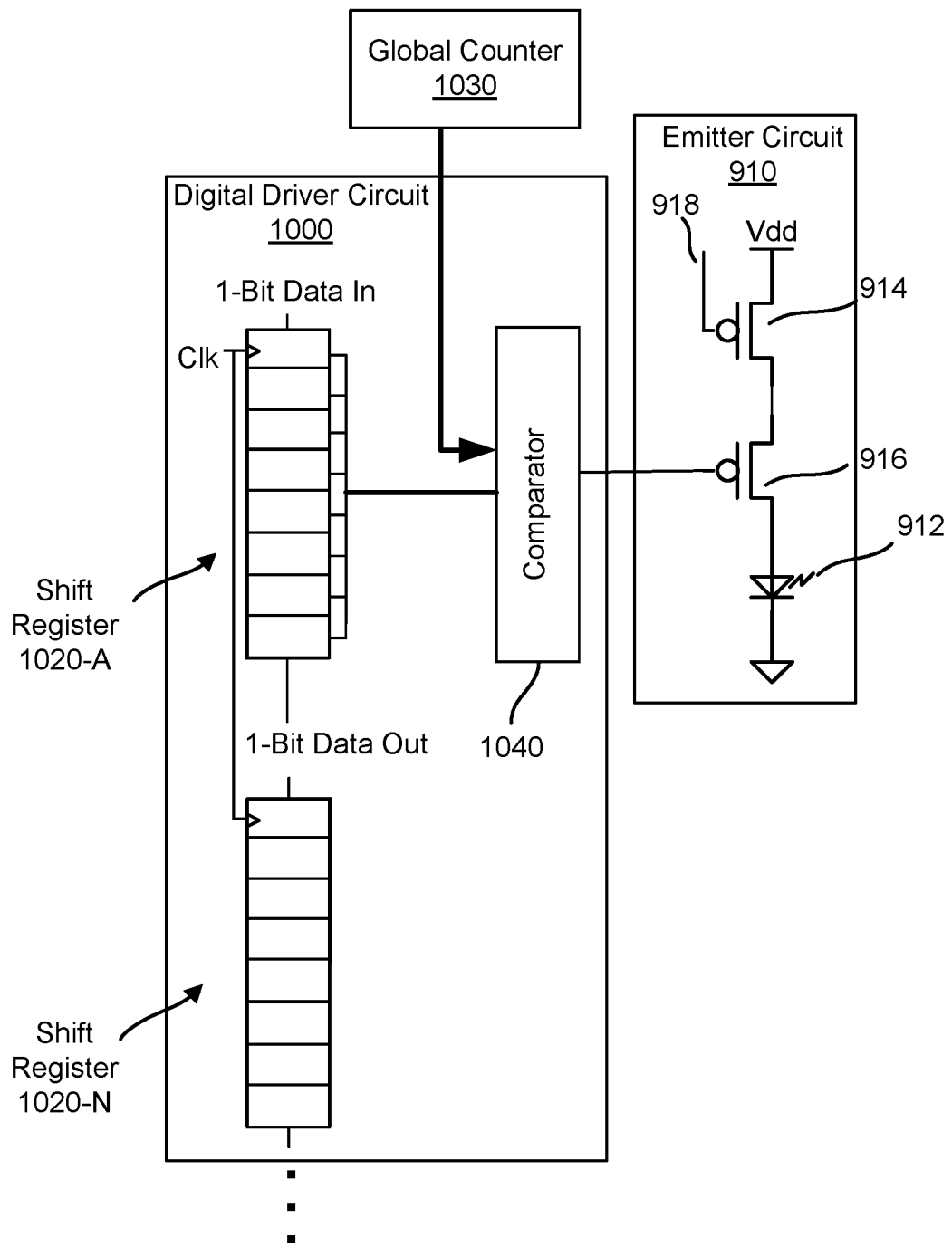
FIG. 10 shows a simplified schematic of a digital driver circuit for driving an emitter using single on/off transitions, in accordance with certain embodiments.

FIG. 10 shows a simplified schematic of a digital driver circuit 1000 for driving a hybrid digital emitter circuit (e.g., emitter circuit 910) using single on/off transitions, in accordance with certain embodiments. The driver circuit 1000 can be used to implement a control scheme that enables longer LSB times (e.g., the control scheme in FIG. 7), thereby combining the benefits of single transition and longer LSB times. The driver circuit 1000 includes shift registers 1020, which are analogous to the shift registers 920 in FIG. 9. Additionally, the driver circuit 1000 includes a counter 1030 and a comparator 1040. The counter 1030 can be a global counter shared by other driver circuits 1000. The output of the counter 1030 can be an N-bit binary value, where N is equal to the number of stages in the shift register 1020.

The comparator 1040 replaces the MUX 940 from FIG. 9 and has inputs coupled to each stage of shift register 1020-A. Similar to the MUX 940, a separate comparator may be provided for each shift register 1020. The comparator 1040 receives the entire input data value from the shift register 1020-A and compares the input data value to the value of the counter 1030 to output a logical "1" when the counter 1030 value is less than the input data value. The emitter 912 is driven using a single transition because the output of the comparator 1040 is a single pulse. If the transistor 916 is a PMOS transistor, then the emitter 912 will be turned on when the output of counter 1030 is logical "0." This means that the emitter 916 is off until the value of the counter 1030 becomes greater than or equal to the value stored in the shift register 1020-A. The comparator 1040 will keep the emitter 912 turned on for a certain period of time, for example, until the value of the counter 1030 is reset.

Figure 11:
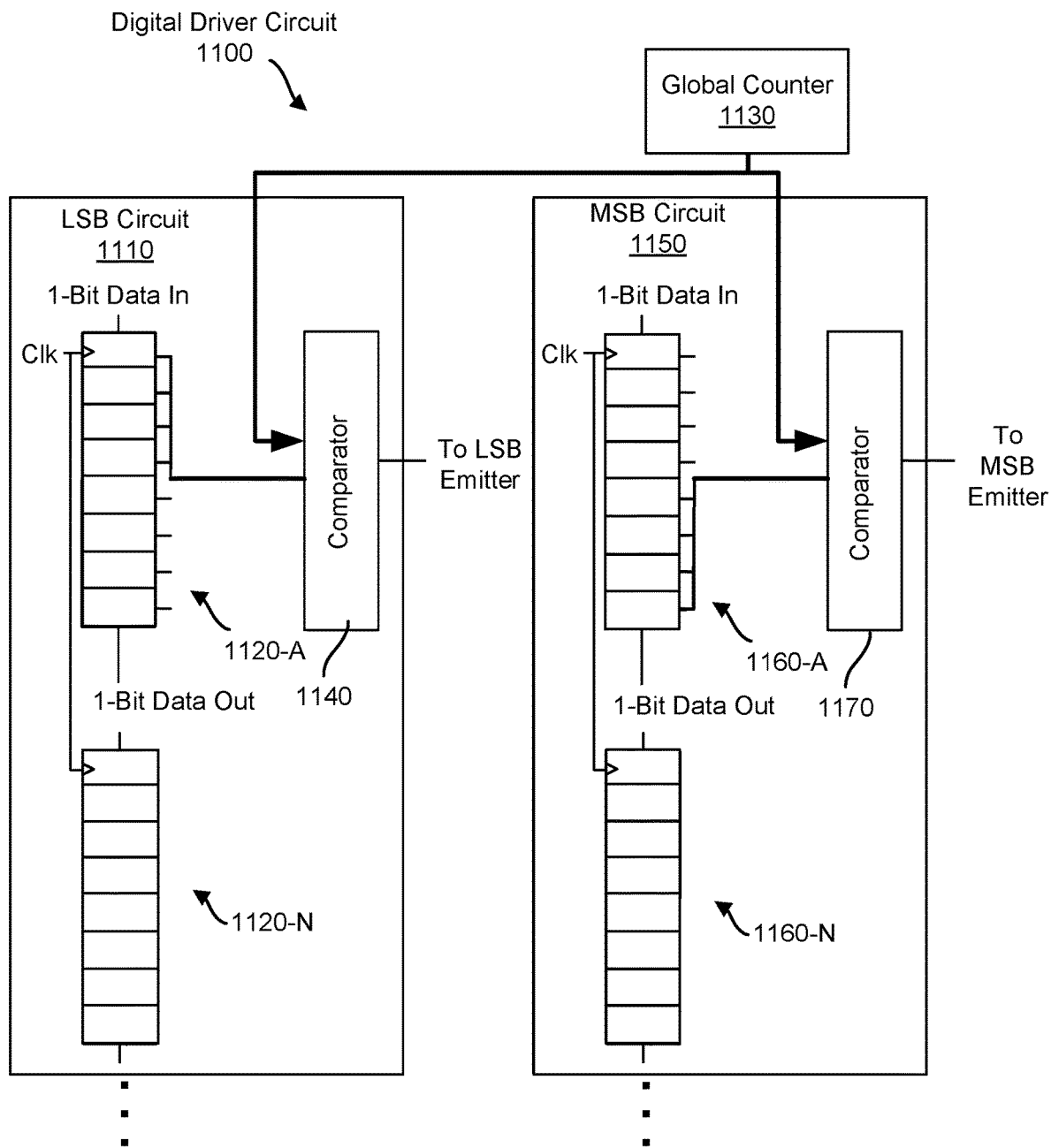
FIG. 11 shows a simplified schematic of a digital driver circuit for driving an emitter using single on/off transitions, in accordance with certain embodiments.

FIG. 11 shows a simplified schematic of a digital driver circuit 1100 for driving an emitter circuit using single on/off transitions, in accordance with certain embodiments. The driver circuit 1100 includes an LSB circuit 1110 and an MSB circuit 1150, each of which includes components analogous to those described with respect to the driver circuit 1000. For example, LSB circuit 1110 may include shift registers 1120 and a comparator 1140, while MSB circuit 1150 may include shift registers 1160 and a comparator 1170. The LSB circuit 1110 and the MSB circuit 1150 share a counter 1130, which can be a global counter. The LSB circuit 1110 drives an LSB emitter. The MSB circuit 1150 drives an MSB emitter. For example if the emitter array were controlled according to Example No. 6 described above, then each emitter in the first two rows of an eight row column would be driven using an instance of comparator 1140 and the last six rows would be driven using an instance of comparator 1170.

As shown in FIG. 11, the inputs of the comparator 1140 are coupled to shift stages corresponding to LSBs (e.g., the first four stages of shift register 1120-A) and the inputs of comparator 1170 are coupled to shift stages corresponding to MSBs (e.g., the last four stages of shift register 1160-A). The behavior of the comparators 1140 and 1170 is the same as that described above with respect to comparator 1040. Thus, the comparator 1140 produces a logical "0" to turn on an emitter in an LSB row when the value of the counter 1130 is greater than or equal to the value of the four LSB bits stored in the shift register 1120-A. Similarly, the comparator 1170 produces a logical "0" to turn on an emitter in an MSB row when the value of the counter 1130 is greater than or equal to the value of the four MSB bits stored in the shift register 1160-A.

Digital Controller—Static Register and Comparator Based Driver

Figure 12:
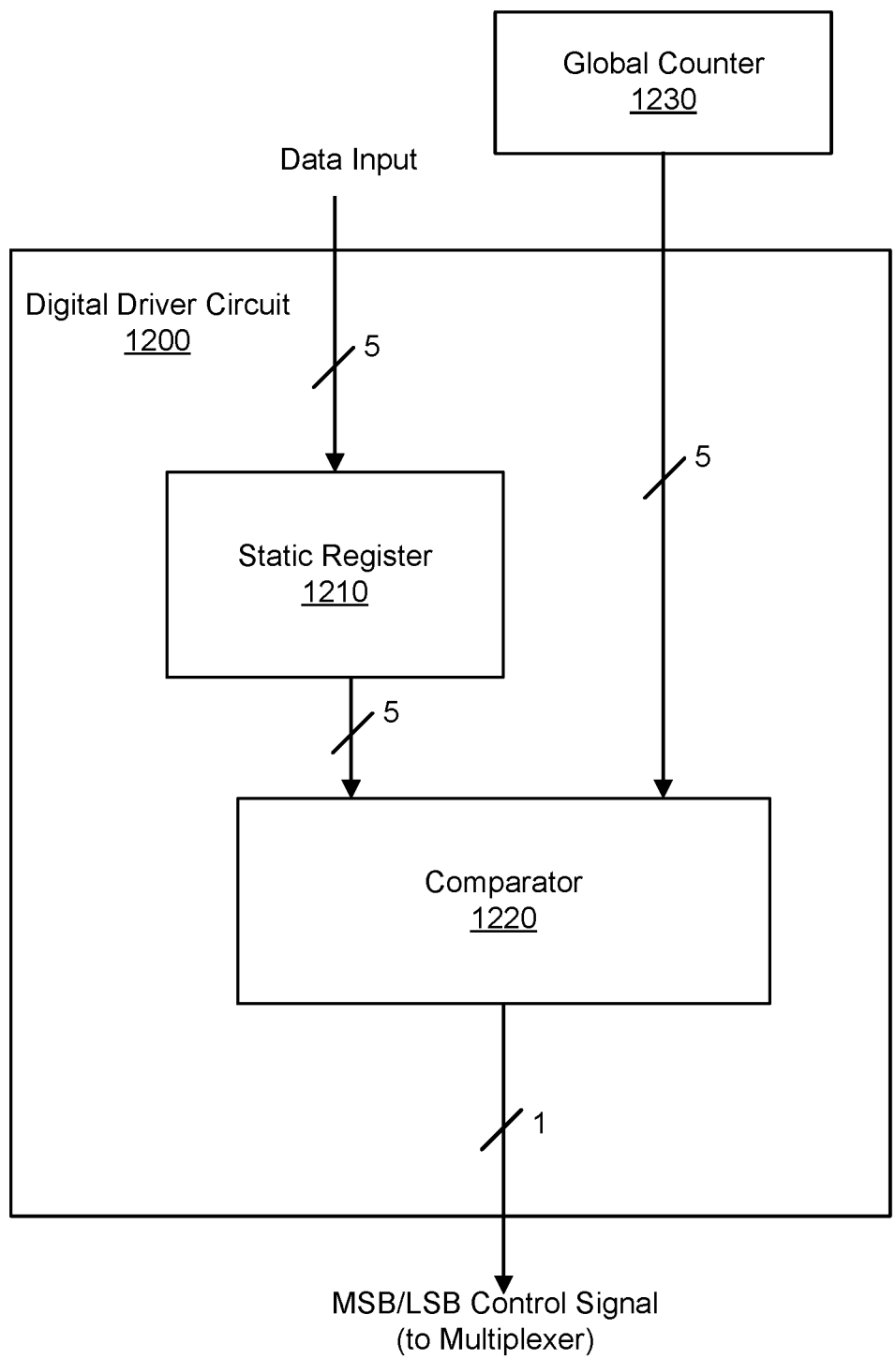
FIG. 12 shows a simplified block diagram of a digital driver circuit including a static register and a comparator, in accordance with certain embodiments.

FIG. 12 shows a simplified block diagram of a digital driver circuit 1200 including a static register 1210 and a comparator 1220. In this example, the static register 1210 receives a 5-bit input data value "Data Input." A separate static register and comparator may be provided for each row. The static registers can be loaded with data values in parallel to store data for all rows simultaneously. The inputs of comparator 1220 are coupled to the output of static register 1210 and the output of a counter 1230, which can be a global counter. The comparator 1220 outputs a 1-bit control signal for driving the emitters in a particular row (e.g., an MSB row or an LSB row). The output of comparator 1220 can be supplied to a MUX (not shown) for generating a PWM signal that drives an emitter. Example truth tables for controlling a MUX based on the output of comparator 1220 are described below in connection with FIG. 15.

Figure 13:
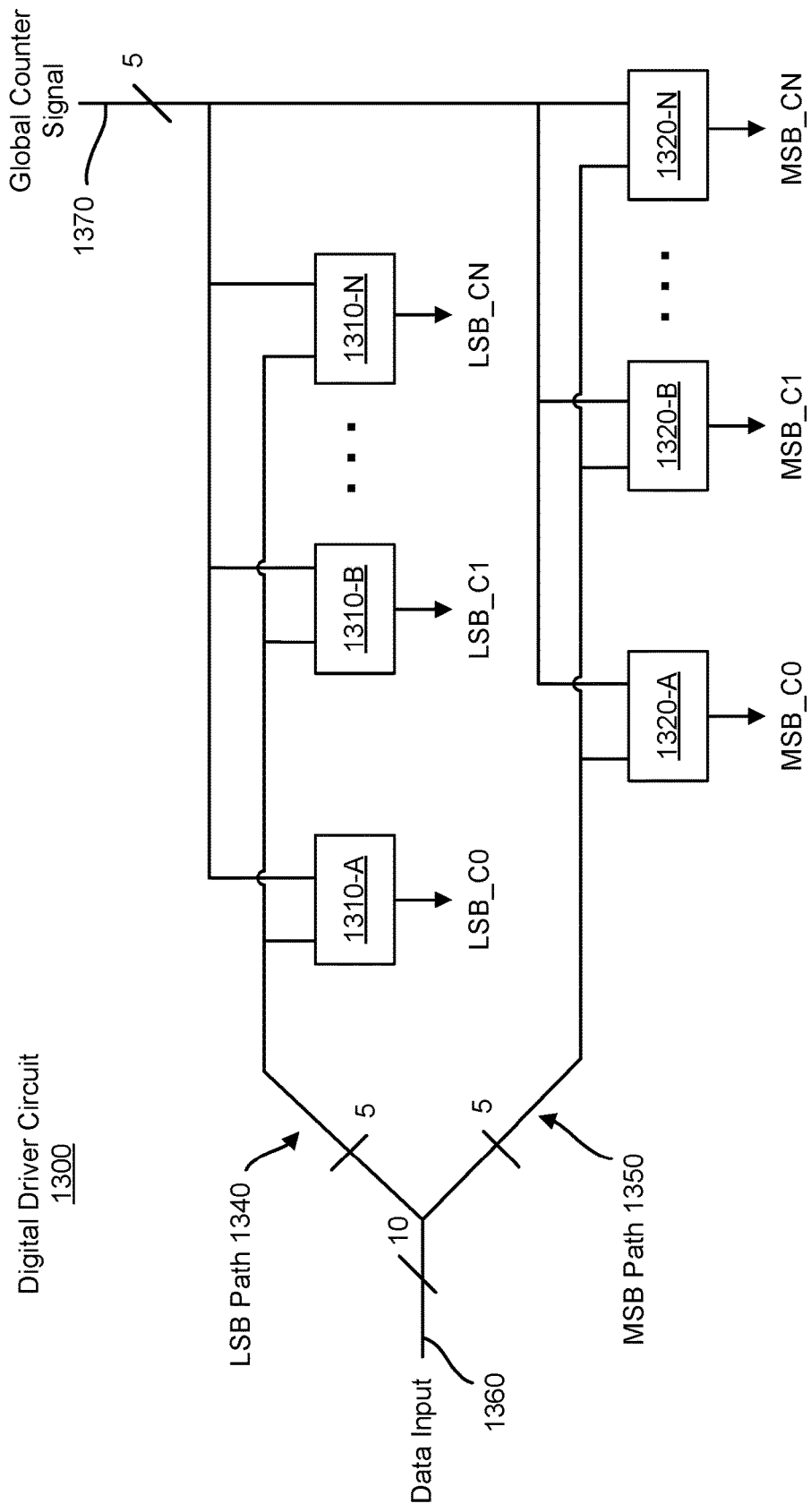
FIG. 13 shows a simplified block diagram of a digital driver circuit formed using a plurality of LSB driver circuits and a plurality of MSB driver circuits, in accordance with certain embodiments.

FIG. 13 shows a simplified block diagram of a digital driver circuit 1300 formed using a plurality of LSB driver circuits 1310 and a plurality of MSB driver circuits 1320. Each of the driver circuits 1310 and 1320 corresponds to an instance of the driver circuit 1200 in FIG. 12. The number of individual driver circuits may correspond to the total number of LSB or MSB rows. For example, in the embodiment of FIG. 14, each emitter group 1405 of a pair of emitter groups 1405-A and 1405-B has two rows (Rows 0 and 1) dedicated to LSBs, six rows (Rows 4 to 9) dedicated to MSBs, and two rows (Rows 2 and 3) that are driven by either MSBs or LSBs depending on column location. Accordingly, there may be eight LSB driver circuits 1310 (generating LSB control signals LSB_C0 to LSB_C7) and sixteen MSB driver circuits 1320 (generating MSB control signals MSB_C0 to MSB_C15). A certain portion of an input data value 1360 (e.g., the first five bits of a 10-bit grayscale value) is delivered to the registers of the LSB driver circuits 1310 through an LSB path 1340. The remainder of the input data 1360 (e.g., the last five bits) is delivered to the registers in the MSB driver circuits 1320 through an MSB path 1350. Each driver circuit is coupled to a global counter signal 1370 which, as shown in FIG. 12, forms an input to a comparator 1220.

Figure 14:
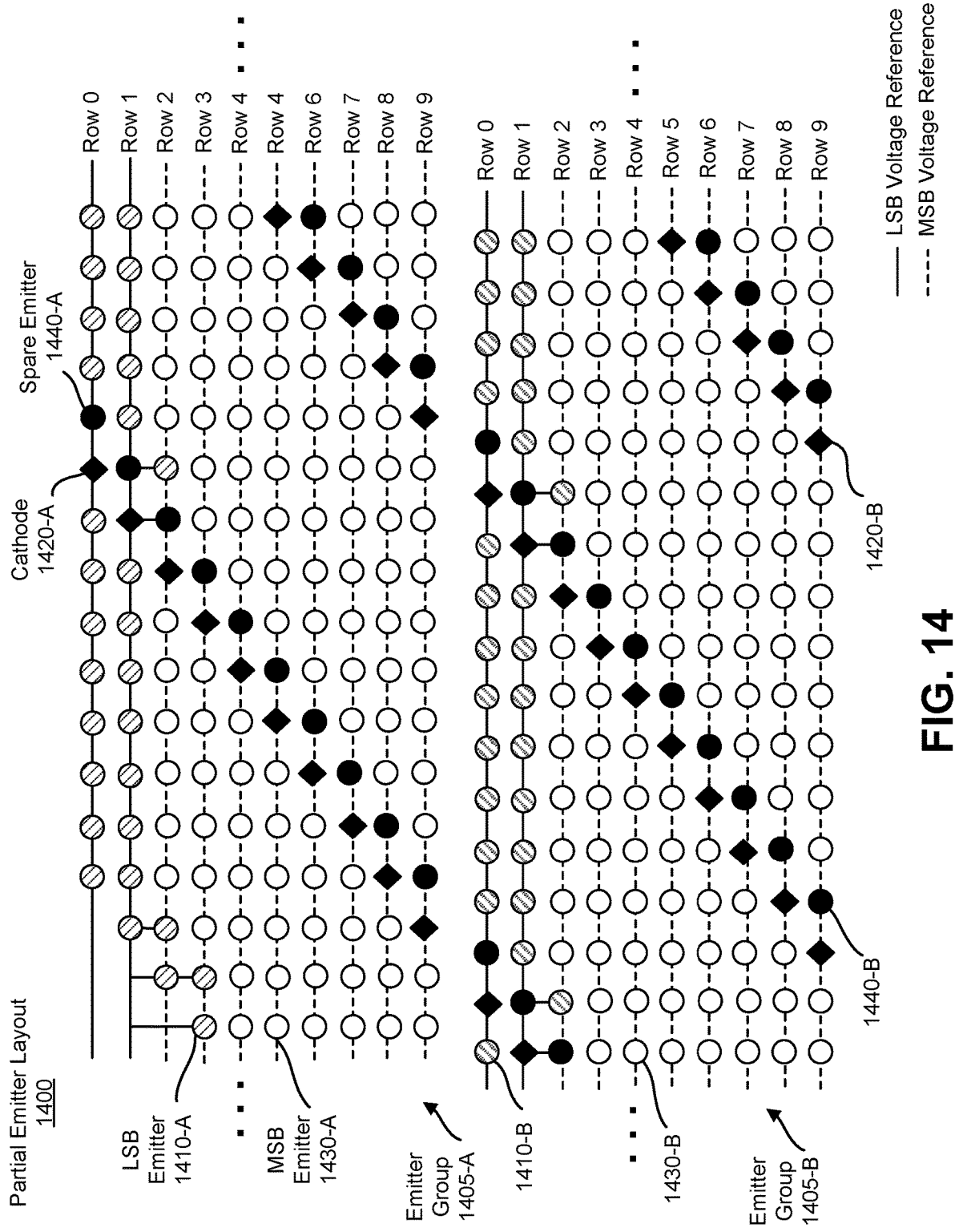
FIG. 14 shows a partial emitter layout for implementing one or more embodiments.

FIG. 14 shows a partial emitter layout 1400 suitable for use with various embodiments of the present disclosure, including for use with the digital driver circuit 1300. The emitter layout 1400 is an example of an eight emitter per column layout (not counting spare emitters). Other emitter layouts can also be used to implement various embodiments of the present disclosure. For example, the emitter layout 1400 could be replaced by a four emitter per column layout or rewired to form a four emitter per column layout (e.g., using half the emitters). The emitters in the emitter layout 1400 are arranged in two groups, 1405-A and 1405-B. The emitter groups 1405 can be located on different substrates (e.g., separate chips or circuit boards) and are laterally offset. The emitters are arranged diagonally and include LSB emitters 1410, MSB emitters 1430, and spare emitters 1440. The emitter layout also includes cathodes 1420. The LSB emitters 1410 are depicted as hatched circles, the cathodes 1420 as diamonds, the MSB emitters 1430 as unshaded circles, and the spare emitters 1440 as shaded circles. Each emitter group 1405 comprises ten rows (Rows 0 to 9), with Rows 0 and 1 being coupled to an LSB voltage reference and Rows 4 to 9 coupled to an MSB voltage reference to generate a corresponding current bias (e.g., a scaled or full current bias). As shown, some emitters in Rows 2 and 3 are LSB emitters and some are MSB emitters. The LSB emitters in Row 3 of emitter group 1405-B are located beyond the portion of the layout shown in the figure, and therefore are not depicted.

Figure 15:
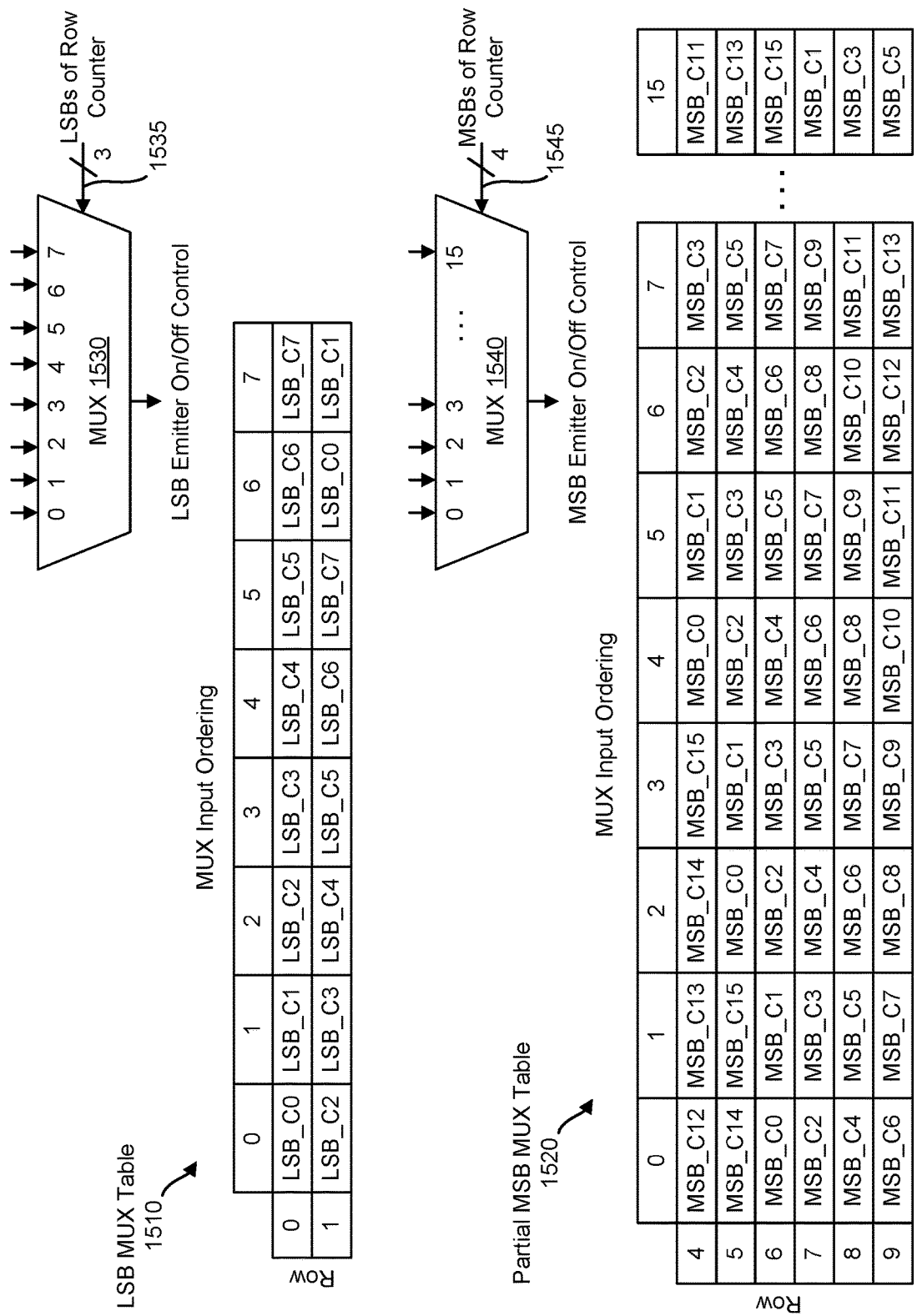
FIG. 15 shows example truth tables for a multiplexer that drives an emitter based on the output of a digital driver circuit including a static register and a comparator, in accordance with certain embodiments.

FIG. 15 shows example truth tables for a MUX that drives an emitter based on the output of a digital driver circuit including a static register and a comparator, e.g., the digital driver circuit 1300. Table 1510 is an LSB MUX table for a MUX 1530 that drives two LSB rows (e.g., Rows 0 and 1). Table 1520 is a partial MSB MUX table for generating control signals for a MUX 1540 that drives six MSB rows (e.g., Rows 4 to 9). Each MUX 1530, 1540 outputs a digital on/off control signal for generating a PWM pulse (e.g., a control signal applied to the gate of transistor 916 in the emitter circuit 910). The truth table entries for Rows 2 and 3 are omitted for simplicity. As explained earlier in connection with the embodiment of FIG. 14, some emitters in Rows 2 and 3 can be used as LSB emitters and some can be used as MSB emitters. Therefore, whether an emitter in Row 2 or 3 is driven based on the output of MUX 1530 or MUX 1540 depends on column location. Accordingly, it is understood that Tables 1510 and 1520 can each be extended to include entries for Rows 2 and 3.

As shown in Table 1510, a select input 1535 of MUX 1530 can have values from 0 to 7. Each value of the select input 1535 causes the MUX 1530 to select a different combination of LSB control signals. For example, when the select input 1535 is 0, Row 0 is driven based on the state of LSB_C0 and Row 1 is driven based on the state of LSB_C2. Over the course of all eight values of the select input 1535, each of eight LSB control signals (LSB_C0 to LSB_C7) is selected once for each LSB row. Similarly, each value of a select input 1545 of MUX 1540 causes the MUX 1540 to select a different combination of MSB control signals. Over the course of all sixteen values of the select input 1545, each of sixteen MSB control signals (MSB_C0 to MSB_C15) is selected once for each MSB row. The select input 1535 and the select input 1545 can be generated using the LSBs and MSBs of a row counter (e.g., bits 0 to 2 and bits 3 to 6, respectively). The row counter can be part of a digital driver circuit or a component coupled to the digital driver circuit, e.g., a row counter within the controller 230 of FIG. 2. The row counter is incremented in accordance with a row timing determined by the controller, e.g., to sequentially activate rows one at a time based on the LSB/MSB control signals.

Methods for Controlling a Display Using a Hybrid Emitter Circuit

Figure 16:
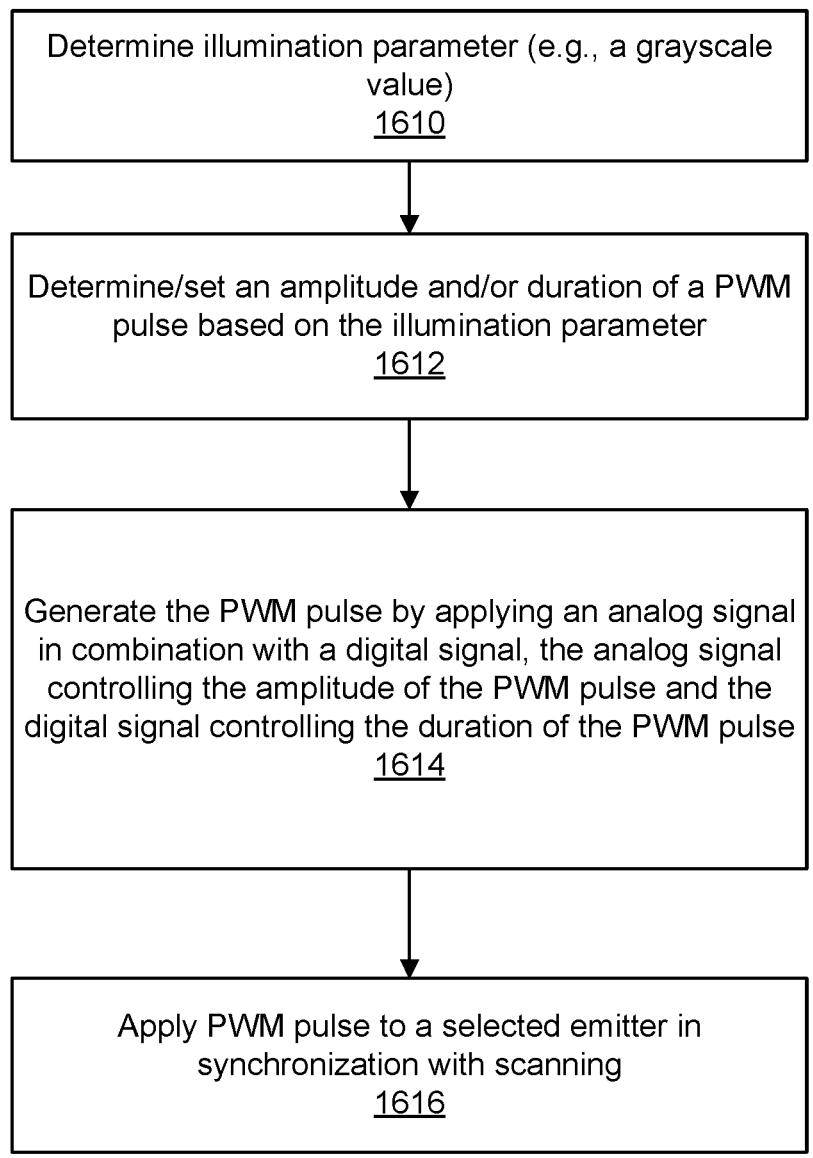
FIG. 16 shows a simplified flowchart of a method for controlling a display using a hybrid analog emitter circuit, in accordance with certain embodiments.

FIG. 16 shows a flowchart of a method 1600 for controlling a display using a hybrid analog emitter circuit, in accordance with certain embodiments. The method 1600 can be performed by a controller of a display system (e.g., controller 230) and using a hybrid analog emitter circuit (e.g., hybrid analog emitter circuit 400) or a hybrid digital emitter circuit (e.g., hybrid digital emitter circuit 700). At step 1610, the controller determines an illumination parameter (e.g., a grayscale value generated after processing through the display pipeline described in FIG. 8).

At step 1612, based on the illumination parameter from step 1610, the controller determines or sets at least one of an amplitude or a duration of a PWM pulse. The amplitude of the PWM pulse can be controlled by an analog signal having a particular signal level (e.g., a current level). The duration of the PWM pulse can be controlled by a digital signal with certain timing characteristics. The analog signal and the digital signal can be configured such that the PWM pulse causes the emitter to produce an output intensity corresponding to an intensity represented by the illumination parameter, e.g., a desired output intensity. For example, the digital signal may correspond to a fixed pulse duration and the controller may calculate or look up a current level or pulse amplitude needed to generate the output intensity based on the fixed pulse duration, as described earlier in connection with the control scheme of FIG. 6. In another example, the analog signal is at a fixed current level (corresponding to a fixed pulse amplitude) and the controller may calculate or look up a pulse duration based on the fixed current level, then set the digital signal accordingly.

In one embodiment, each emitter in a column comprising N number of rows is driven to output the same intensity so that when the column is scanned (e.g., by scanning assembly 280) the resulting intensity of a pixel in an output image is equal to N times the brightness of each individual emitter. Thus, the controller may determine a current level or pulse amplitude sufficient for generating an intensity equal to the desired output intensity divided by the number of rows. In some embodiments, the controller may set the amplitude and/or the pulse duration using the analog and digital signals, without explicitly calculating or looking up the amplitude or pulse duration.

At step 1614, the controller generates the PWM pulse by applying the analog signal and the digital signal described in connection with step 1612 in combination with each other. If the emitter circuit 400 is used, the PWM pulse can be generated by applying the Digital Ctr signal to set the pulse duration and switching transistor 430 on using the Scan/Row signal to store onto capacitor 450 a voltage corresponding to the analog signal level determined in step 1612 (e.g., a voltage sufficient to generate a desired current level through transistor 420). The voltage is applied through the Data/Col signal. If the emitters in a column are driven to output the same intensity, the emitter circuits 400 of the column can all be connected to the same Data/Col signal and activated sequentially by applying a corresponding Scan/Row signal at appropriate times, as shown in FIG. 6.

At step 1616, the controller applies the PWM pulse to a selected emitter in synchronization with scanning. Steps 1614 and 1616 can be performed concurrently by, for example, timing the output of instructions and/or signals (e.g., the Data/Col signal and the Digital Ctr signal) to generate the PWM pulse within an emitter circuit associated with the selected emitter. The instructions and/or signals may be timed so that the selected emitter produces light at an intensity corresponding to the illumination parameter and at an appropriate time relative to the position of the scanning assembly (e.g., at a time when the reflective surface of the scanning assembly faces the selected emitter).

Figure 17:
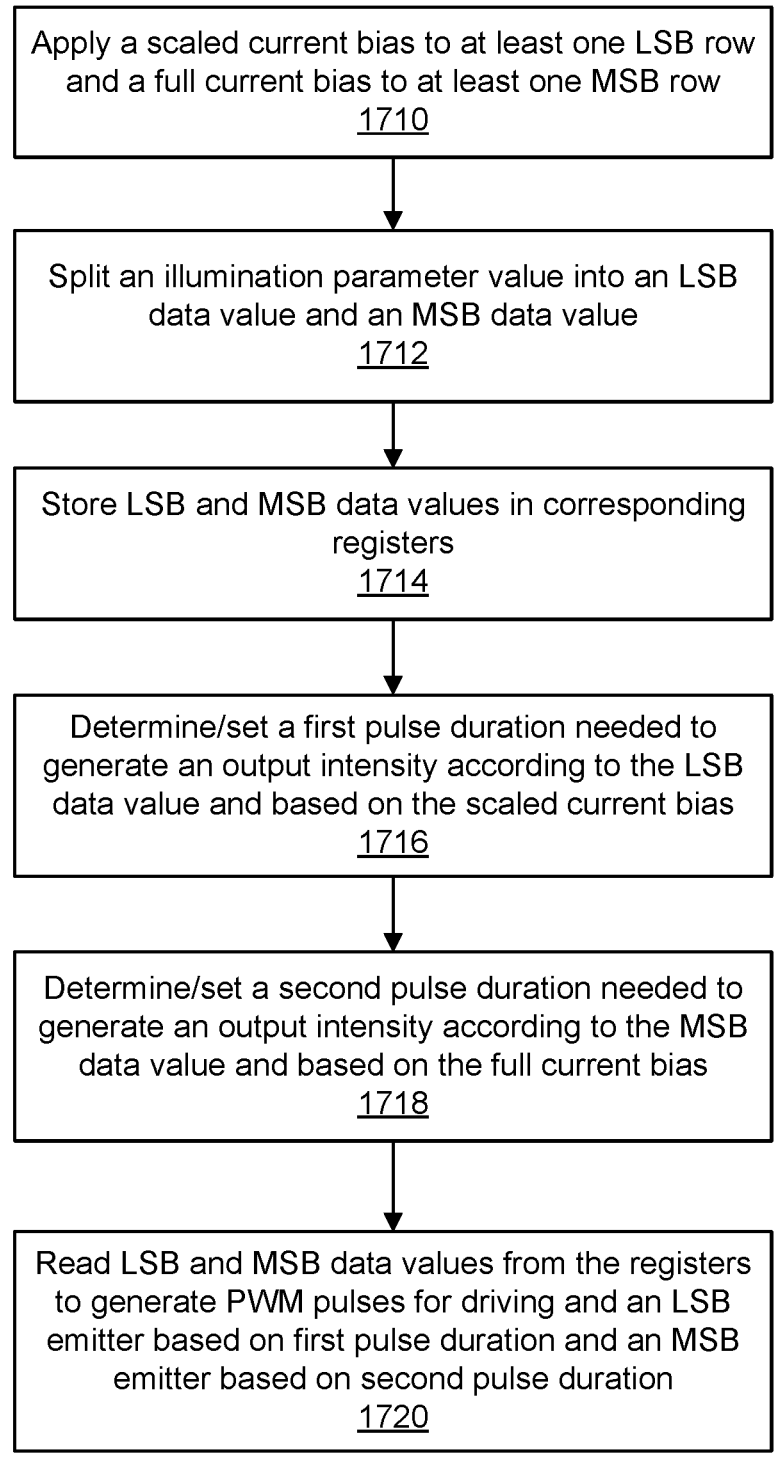
FIG. 17 shows a simplified flowchart of a method for controlling a display using a hybrid digital emitter circuit, in accordance with certain embodiments.

FIG. 17 shows a flowchart of a method 1700 for controlling a display using a hybrid digital emitter circuit, in accordance with certain embodiments. The method 1700 can be performed by a controller of a display system (e.g., controller 230) and a hybrid digital emitter circuit (e.g., hybrid digital emitter circuit 700). At step 1710, the controller applies a scaled current bias to at least one LSB row and a full current bias to at least one MSB row. As described earlier in connection with Example Nos. 2 to 8, the scaled current bias can be generated according to a scale factor that depends on the number of LSB rows, the number of MSB rows, and the number of PWM control bits, in order to produce a desired range of grayscale values.

At step 1712, controller splits a digital illumination parameter value into an LSB data value and an MSB data value. The number of bits used for the LSB data value versus the MSB data value can vary. In the embodiment of FIG. 13, the number of LSB bits is equal to the number of MSB bits.

At step 1714, the controller stores the LSB and MSB data values in corresponding registers. For example, if the emitters are driven using the digital driver circuit 1100, the controller can store the LSB data value in shift register 1120-A and the MSB data value in shift register 1160-A. Alternatively, if the digital driver circuit 1200 is used, the controller can store the LSB data value in a static register 1210 of a digital driver circuit 1200 that generates an LSB control signal and store the MSB data value in a static register 1210 of a digital driver circuit 1200 that generates an MSB control signal. Further, as explained earlier in Example Nos. 4 and 8, the LSB rows and/or MSB rows can be driven differently through independent control of the rows. When rows are driven in the same way (or anytime the data values need to be reused), the data values can be stored in static registers that are subsequently read from again when driving a different row (e.g., according to the embodiment of FIG. 13) or shifted using shift registers, where each shift register drives a different row (e.g., according to the embodiment of FIG. 11).

At step 1716, the controller determines or sets a first pulse duration needed to generate an output intensity according to the LSB data value and based on the scaled current bias. For example, if the emitter circuit 700 is used, the controller may calculate or look up a pulse duration that, when applied in combination with the scaled current bias, causes the emitter 710 to produce an output intensity corresponding to the LSB data value. If the emitters are scanned so as to aggregate the intensities of emitters in different rows, the controller may determine a pulse duration sufficient for generating a intensity equal to the output intensity corresponding to the LSB data value divided by the number of LSB rows that contribute to an output pixel (e.g., one LSB row in the example emitter circuit of FIG. 7).

At step 1718, the controller determines or sets a second pulse duration needed to generate an output intensity according to the MSB data value and based on the full current bias. For example, the second pulse duration can be determined in a similar manner to that described with respect to the determination of the first pulse duration in step 1716, except that the output intensity now corresponds to the MSB data value and the second pulse duration can be based on the number of MSB rows that contribute to an output pixel (e.g., three MSB rows in the embodiment of FIG. 7).

At step 1720, the controller reads the LSB and MSB data values from their corresponding registers to generate PWM pulses for driving an LSB emitter based on the first pulse duration and an MSB emitter based on the second pulse duration. The PWM pulses can be generated, for example, using the digital driver circuits of FIG. 11 or FIG. 13. Similar to the applying of the PWM pulse in step 1616 of FIG. 16, the PWM pulses in step 1720 can be applied in synchronization with scanning. For example, the controller can control the timing with which input data values are loaded into a register in a digital driver circuit (e.g., shift register 920 or static register 1210), the timing of MUX selection signals (e.g., select inputs 1535 and 1545) and/or the running of a counter (e.g., counter 1130 or counter 1230).

Example HMD Device

Figure 18:
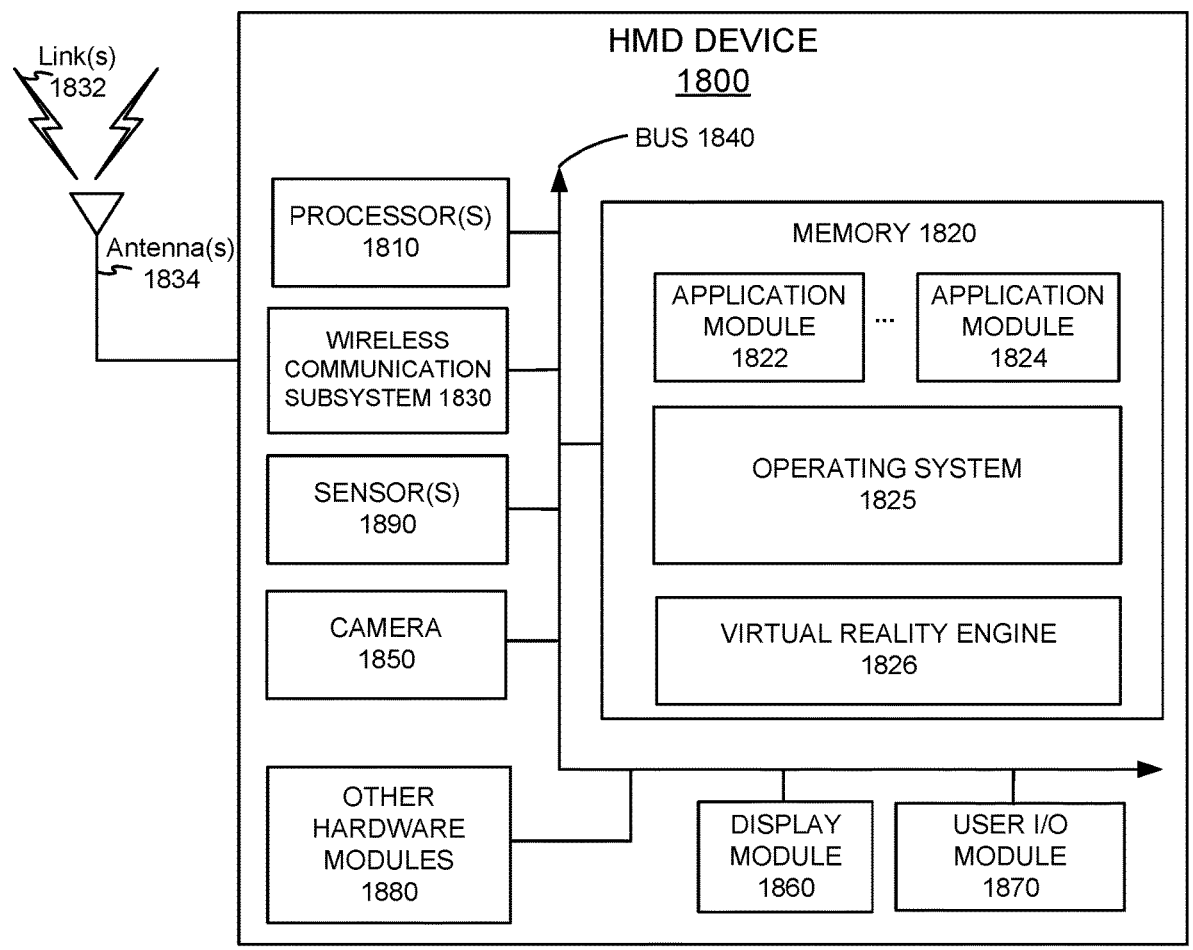
FIG. 18 is a simplified block diagram of a head-mounted display device for implementing one or more embodiments.

FIG. 18 is a simplified block diagram of an HMD device 1800 for implementing one or more embodiments. In this example, HMD device 1800 may include one or more processor(s) 1810 and a memory 1820. Processor(s) 1810 may be configured to execute instructions for performing operations at a number of components, and can be, for example, a general-purpose processor or microprocessor suitable for implementation within a portable electronic device. Processor(s) 1810 may be communicatively coupled with a plurality of components within HMD device 1800. To realize this communicative coupling, processor(s) 1810 may communicate with the other illustrated components across a bus 1840. Bus 1840 may be any subsystem adapted to transfer data within HMD device 1800. Bus 1840 may include a plurality of computer buses and additional circuitry to transfer data.

Memory 1820 may be coupled to processor(s) 1810. In some embodiments, memory 1820 may offer both short-term and long-term storage and may be divided into several units. Memory 1820 may be volatile, such as static random access memory (SRAM) and/or dynamic random access memory (DRAM) and/or non-volatile, such as read-only memory (ROM), flash memory, and the like. Furthermore, memory 1820 may include removable storage devices, such as secure digital (SD) cards. Memory 1820 may provide storage of computer-readable instructions, data structures, program modules, and other data for HMD device 1800. In some embodiments, memory 1820 may be distributed into different hardware modules. A set of instructions and/or code might be stored on memory 1820. The instructions might take the form of executable code that may be executable by HMD device 1800, and/or might take the form of source and/or installable code, which, upon compilation and/or installation on HMD device 1800 (e.g., using any of a variety of generally available compilers, installation programs, compression/decompression utilities, etc.), may take the form of executable code.

In some embodiments, memory 1820 may store a plurality of application modules 1822 through 1824, which may include any number of applications. Examples of applications may include gaming applications, conferencing applications, video playback applications, or other suitable applications. The applications may include a depth sensing function. Application modules 1822-1824 may include particular instructions to be executed by processor(s) 1810. In some embodiments, certain applications or parts of application modules 1822-1824 may be executable by other hardware modules 1880. In certain embodiments, memory 1820 may additionally include secure memory, which may include additional security controls to prevent copying or other unauthorized access to secure information.

In some embodiments, memory 1820 may include an operating system 1825 loaded therein. Operating system 1825 may be operable to initiate the execution of the instructions provided by application modules 1822-1824 and/or manage other hardware modules 1880 as well as interfaces with a wireless communication subsystem 1830 which may include one or more wireless transceivers. Operating system 1825 may be adapted to perform other operations across the components of HMD device 1800 including threading, resource management, data storage control and other similar functionality.

Wireless communication subsystem 1830 may include, for example, an infrared communication device, a wireless communication device and/or chipset (such as a Bluetooth® device, an Institute of Electrical and Electronics Engineers (IEEE) 802.11 device, a Wi-Fi device, a WiMax device, cellular communication facilities, etc.), and/or similar communication interfaces. HMD device 1800 may include one or more antennas 1834 for wireless communication as part of wireless communication subsystem 1830 or as a separate component coupled to any portion of the system. Depending on desired functionality, wireless communication subsystem 1830 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1830 may permit data to be exchanged with a network, other computer systems, and/or any other devices described herein. Wireless communication subsystem 1830 may include a means for transmitting or receiving data, such as identifiers of HMD devices, position data, a geographic map, a heat map, photos, or videos, using antenna(s) 1834 and wireless link(s) 1832. Wireless communication subsystem 1830, processor(s) 1810, and memory 1820 may together comprise at least a part of one or more of a means for performing some functions disclosed herein. For example, processor(s) 1810 may include one or more processors that process image data through a display pipeline and/or drive emitters using a hybrid control scheme.

Embodiments of HMD device 1800 may also include one or more sensors 1890. Sensor(s) 1890 may include, for example, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 1890 may include one or more inertial measurement units (IMUs) and/or one or more position sensors. An IMU may generate calibration data indicating an estimated position of HMD device 1800 relative to an initial position of HMD device 1800, based on measurement signals received from one or more of the position sensors. A position sensor may generate one or more measurement signals in response to motion of HMD device 1800. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least one sensor may use a structured light pattern for sensing.

HMD device 1800 may include a display module 1860. Display module 1860 may be a near-eye display, and may graphically present information, such as images, videos, and various instructions, from HMD device 1800 to a user. Such information may be derived from one or more application modules 1822-1824, virtual reality engine 1826, one or more other hardware modules 1880, a combination thereof, or any other suitable means for resolving graphical content for the user (e.g., by operating system 1825). Display module 1860 may use liquid crystal display (LCD) technology, LED technology (including, for example, OLED, ILED, mLED, AMOLED, TOLED, etc.), light emitting polymer display (LPD) technology, or some other display technology. Display module 1860 can include a scanning display.

HMD device 1800 may include a user input/output module 1870. User input/output module 1870 may allow a user to send action requests to HMD device 1800. An action request may be a request to perform a particular action. For example, an action request may be to start or end an application or to perform a particular action within the application. User input/output module 1870 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to HMD device 1800. In some embodiments, user input/output module 1870 may provide haptic feedback to the user in accordance with instructions received from HMD device 1800. For example, the haptic feedback may be provided when an action request is received or has been performed.

HMD device 1800 may include a camera 1850 that may be used to take photos or videos of a user, for example, for tracking the user's eye position. Camera 1850 may also be used to take photos or videos of the environment, for example, for VR, AR, or MR applications. Camera 1850 may include, for example, a complementary metal-oxide-semiconductor (CMOS) image sensor with a few millions or tens of millions of pixels. In some implementations, camera

1850 may include two or more cameras that may be used to capture three-dimensional images.

In some embodiments, HMD device 1800 may include a plurality of other hardware modules 1880. Each of the hardware modules 1880 may be a physical module within HMD device 1800. Some of the hardware modules 1880 may be temporarily configured to perform specific functions or temporarily activated. Examples of hardware modules 1880 may include, for example, an audio output and/or input module (e.g., a microphone or speaker), a near field communication (NFC) module, a rechargeable battery, a battery management system, a wired/wireless battery charging system, etc. In some embodiments, one or more functions of the hardware modules 1880 may be implemented in software.

In some embodiments, memory 1820 of HMD device 1800 may also store a virtual reality engine 1826. Virtual reality engine 1826 may execute applications within HMD device 1800 and receive position information, acceleration information, velocity information, predicted future positions, or some combination thereof of HMD device 1800 from the various sensors. In some embodiments, the information received by virtual reality engine 1826 may be used for producing a signal (e.g., display instructions) to display module 1860. For example, if the received information indicates that the user has looked to the left, virtual reality engine 1826 may generate content for HMD device 1800 that mirrors the user's movement in a virtual environment. Additionally, virtual reality engine 1826 may perform an action within an application in response to an action request received from user input/output module 1870 and provide feedback to the user. The provided feedback may be visual, audible, or haptic feedback. In some implementations, processor(s) 1810 may include one or more graphics processing units (GPUs) that execute virtual reality engine 1826.

In various implementations, the above-described hardware and modules may be implemented on a single device or on multiple devices that can communicate with one another using wired or wireless connections. For example, in certain embodiments, some components or modules, such as GPUs, virtual reality engine 1826, and applications (e.g., tracking application), may be implemented on a console separate from the head-mounted display device. In certain embodiments, one console may be connected to or support more than one HMD.

In alternative configurations, different and/or additional components may be included in HMD device 1800. Similarly, functionality of one or more of the components can be distributed among the components in a manner different from the manner described above. For example, in some embodiments, HMD device 1800 may be modified to include other system environments, such as an AR system environment and/or an MR environment.

The methods, systems, and devices discussed above are examples. Various embodiments may omit, substitute, or add various procedures or components as appropriate. For instance, in alternative embodiments, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, certain circuits, processes, systems, structures, and techniques have been shown without unnecessary detail in order to avoid obscuring the embodiments. Various changes may be made in the function and arrangement of elements without departing from the spirit and scope of the present disclosure.

Also, some embodiments were described as processes depicted as flow diagrams or block diagrams. Although the operations were described as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application, a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one embodiment, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Various modifications and equivalents are within the scope of the following claims.

What is claimed is:

1. A display system, comprising:
    an emitter array comprising a column of light emitters, the light emitters in the column being of the same color;
    a scanning assembly configured to form an output image by scanning the column such that at different rotational positions of the scanning assembly, light from light emitters in different rows of the column contributes to a same location in the output image; and
    a controller configured to drive the light emitters using pulse-width modulation (PWM), the driving of the light emitters comprising:
        based on an illumination parameter, generating a PWM pulse by applying an analog signal in combination with applying a digital signal, wherein the analog signal controls an amplitude of the PWM pulse and the digital signal controls a duration of the PWM pulse, and
        applying the PWM pulse to a particular light emitter, wherein the PWM pulse is applied in synchronization with the scanning performed by the scanning assembly and causes the light emitter to emit light at an intensity corresponding to the illumination parameter.

2. The display system of claim 1, wherein the scanning assembly includes a mirror controlled by a microelectromechanical systems (MEMS) device.

3. The display system of claim 1, wherein the analog signal provides a current bias that activates a first transistor coupled to the light emitter, and wherein the digital signal activates a second transistor connected in series with the first transistor.

4. The display system of claim 1, wherein the controller is configured to use a fixed PWM pulse duration for driving each of the light emitters, and wherein the controller is further configured to set the amplitude of the PWM pulse based on a value of the illumination parameter.

5. The display system of claim 1, wherein the controller is configured to use a fixed PWM pulse amplitude for driving each of the light emitters, and wherein the controller is further configured to set the duration of the PWM pulse based on a value of the illumination parameter.

6. The display system of claim 1, wherein at least one of the light emitters is driven using a PWM pulse generated by applying a first current bias, and wherein at least one of the light emitters is driven using a PWM pulse generated by applying a second current bias having a different current level than the first current bias.

7. The display system of claim 6, wherein the illumination parameter is a binary value having a plurality of bits, wherein the first current bias is less than the second current bias and generates a PWM pulse for an emitter driven based on one or more least significant bits of the binary value, and wherein the second current bias generates a PWM pulse for an emitter driven based on one or more most significant bits of the same binary value.

8. The display system of claim 1, wherein the controller is configured to determine a ratio between the amplitude of the PWM pulse and the duration of the PWM pulse based on a value of the illumination parameter, wherein the ratio is such that the duration of the PWM pulse contributes more to an area of the PWM pulse at a lower illumination parameter value and less to the area of the PWM pulse at a higher illumination value.

9. The display system of claim 1, wherein the controller is configured to generate the digital signal by storing a value of the illumination parameter in a digital shift register and reading the stored value into a multiplexer or comparator.

10. The display system of claim 9, wherein the stored value is read into a comparator that compares the stored value to a value of a counter.

11. A method for operating a display, comprising:
    forming an output image by scanning a column of light emitters in an emitter array, the light emitters in the column being of the same color, wherein the column is scanned using a scanning assembly such that at different rotational positions of the scanning assembly, light from light emitters in different rows of the column contributes to a same location in the output image; and
    driving the light emitters using pulse-width modulation (PWM), the driving of the light emitters comprising:

based on an illumination parameter, generating a PWM pulse by applying an analog signal in combination with applying a digital signal, wherein the analog signal controls an amplitude of the PWM pulse and the digital signal controls a duration of the PWM pulse, and applying the PWM pulse to a particular light emitter, wherein the PWM pulse is applied in synchronization with the scanning and causes the light emitter to emit light at an intensity corresponding to the illumination parameter.

12. The method of claim 11, wherein the scanning assembly includes a mirror controlled by a microelectromechanical systems (MEMS) device.

13. The method of claim 11, wherein the analog signal provides a current bias that activates a first transistor coupled to the light emitter, and wherein the digital signal activates a second transistor connected in series with the first transistor.

14. The method of claim 11, further comprising:
using a fixed PWM pulse duration for driving each of the light emitters; and
setting the amplitude of the PWM pulse based on a value of the illumination parameter.

15. The method of claim 11, further comprising:
using a fixed PWM pulse amplitude for driving each of the light emitters; and
setting the duration of the PWM pulse based on a value of the illumination parameter.

16. The method of claim 11, further comprising:
driving at least one of the light emitters using a PWM pulse generated by applying a first current bias; and
driving at least one of the light emitters using a PWM pulse generated by applying a second current bias having a different current level than the first current bias.

17. The method of claim 16, wherein the illumination parameter is a binary value having a plurality of bits, wherein the first current bias is less than the second current bias and generates a PWM pulse for an emitter driven based on one or more least significant bits of the binary value, and wherein the second current bias generates a PWM pulse for an emitter driven based on one or more most significant bits of the same binary value.

18. The method of claim 11, further comprising:
generating the digital signal by storing a value of the illumination parameter in a digital shift register and reading the stored value into a multiplexer or comparator.

19. The method of claim 18, wherein the stored value is read into a comparator that compares the stored value to a value of a counter.

20. A non-transitory computer-readable storage medium storing instructions which, when executed by one or more processors of a display system, cause the one or more processors to perform the following:

forming an output image by scanning a column of light emitters in an emitter array, the light emitters in the column being of the same color, wherein the column is scanned using a scanning assembly such that at different rotational positions of the scanning assembly, light from light emitters in different rows of the column contribute to a same location in the output image; and driving the light emitters using pulse-width modulation (PWM), the driving of the light emitters comprising:
based on an illumination parameter, generating a PWM pulse by applying an analog signal in combination with applying a digital signal, wherein the analog signal controls an amplitude of the PWM pulse and the digital signal controls a duration of the PWM pulse, and applying the PWM pulse to a particular light emitter, wherein the PWM pulse is applied in synchronization with the scanning and causes the light emitter to emit light at an intensity corresponding to the illumination parameter.

* * * * *